US00RE39742E

(19) United States
(12) Reissued Patent
Kasahara et al.

(10) Patent Number: US RE39,742 E
(45) Date of Reissued Patent: *Jul. 24, 2007

(54) DISPLAY DEVICE AND LUMINANCE CONTROL METHOD THEREFOR

(75) Inventors: Mitsuhiro Kasahara, Hirakata (JP); Yuichi Ishikawa, Ibaraki (JP); Tomoko Morita, Hirakata (JP)

(73) Assignee: Matsushita Electric Industrial Co., Ltd., Osaka (JP)

( * ) Notice: This patent is subject to a terminal disclaimer.

(21) Appl. No.: 10/727,330

(22) Filed: Dec. 4, 2003

Related U.S. Patent Documents

Reissue of:
(64) Patent No.: 6,492,965
Issued: Dec. 10, 2002
Appl. No.: 09/994,775
Filed: Nov. 28, 2001

U.S. Applications:
(62) Division of application No. 09/856,161, filed as application No. PCT/JP00/06212 on Sep. 11, 2000, now Pat. No. 6,414,660.

(30) Foreign Application Priority Data

Oct. 4, 1999 (JP) ..... 11-283228

(51) Int. Cl.
*G09G 3/28* (2006.01)

(52) U.S. Cl. ..... 345/63; 345/211; 345/690
(58) Field of Classification Search ..... 345/60, 345/63, 20 X, 211, 213, 589, 690
See application file for complete search history.

(56) References Cited

U.S. PATENT DOCUMENTS 5,748,171 A 5/1998 Ishizaki et al.
5,757,343 A 5/1998 Nagakubo
6,023,130 A 2/2000 Sakasegawa et al.
6,133,682 A 10/2000 Murai et al.
6,191,505 B1 2/2001 Matsuyama
6,270,061 B1 8/2001 Bouquet et al.

(Continued)

FOREIGN PATENT DOCUMENTS

EP 0888004 12/1998
EP 0924683 6/1999
EP 0930603 7/1999
JP 6-282241 10/1994
JP 6-289812 2/1995
JP 9-6283 1/1997

(Continued)

OTHER PUBLICATIONS

English Language abstract of JP 9–198005.*
English Language abstract of JP 11–288244.*
English Language abstract of JP11–231828.*
English Language Abstract of EP 0924683.
English Language Abstract of EP 0930603.
English Language Abstract of JP 6–282241.

(Continued)

*Primary Examiner*—Kent Chang
(74) *Attorney, Agent, or Firm*—Greenblum & Bernstein, P.L.C.

(57) ABSTRACT

A temperature difference estimated value is found from a video signal using a temperature estimated value representing the temperature of the panel outer periphery of a display screen of a PDP and a reference value representing the temperature of the panel outer periphery of the PDP which is outputted from a panel periphery temperature setter by a temperature difference estimator, and the luminance of an image displayed on a display is controlled depending on the temperature difference estimated value by a controller and a brightness controller.

10 Claims, 18 Drawing Sheets

U.S. PATENT DOCUMENTS

| | | | |
|---|---|---|---|
| 6,288,495 | B1 | 9/2001 | Yashiro |
| 6,313,821 | B1 | 11/2001 | Mizuno |
| 6,320,568 | B1 | 11/2001 | Zavracky |
| 6,331,843 | B1 | 12/2001 | Kasahara et al. |
| 6,414,660 | B1 | 7/2002 | Kasahara et al. |
| 6,441,803 | B1 | 8/2002 | Kasahara et al. |
| 6,492,965 | B2 | 12/2002 | Kasahara et al. |
| 6,509,884 | B2 | 1/2003 | Kasahara et al. |

FOREIGN PATENT DOCUMENTS

| | | |
|---|---|---|
| JP | 9-198005 | 7/1997 |
| JP | 9-288467 | 11/1997 |
| JP | 10215424 | 8/1998 |
| JP | 11-15387 | 1/1999 |
| JP | 11194745 | 7/1999 |
| JP | 11212517 | 8/1999 |
| JP | 11219152 | 8/1999 |
| JP | 11231828 | 8/1999 |
| JP | 11283228 | 10/1999 |
| JP | 11288244 | 10/1999 |
| JP | 2001-200087 | 7/2001 |
| JP | 11-283228 | * 10/2001 |
| WO | 99/30308 | 6/1999 |
| WO | 99/30309 | 6/1999 |

OTHER PUBLICATIONS

English Language Abstract of JP 9–6283.
English Language Abstract of JP 9–288467.
English Language Abstract of JP 10–215424.
English Language Abstract of JP 11–194745.
English Language Abstract of JP 11–212517.
English Language Abstract of JP 6–289812.
English Language Abstract of JP 11–219152.
English Language Abstract of JP 11–15387.
An article entitled "A Heat Control Method for Plasma Display Panel," *ITE '98: 1998 ITE Annual Convention,* together with a partial English language translation of the same.

* cited by examiner

FIG. 6

| GRAY SCALE LEVEL | SF1 | SF2 | SF3 | SF4 | SF5 | SF6 | SF7 | SF8 |
|---|---|---|---|---|---|---|---|---|
| 0 | | | | | | | | |
| 1 | ○ | | | | | | | |
| 2 | | ○ | | | | | | |
| 3 | ○ | ○ | | | | | | |
| 4～7 | SAME AS 0～3 | | ○ | | | | | |
| 8～15 | SAME AS 0～7 | | | ○ | | | | |
| 16～31 | SAME AS 0～15 | | | | ○ | | | |
| 32～63 | SAME AS 0～31 | | | | | ○ | | |
| 64～127 | SAME AS 0～63 | | | | | | ○ | |
| 128～255 | SAME AS 0～127 | | | | | | | ○ |

FIG. 7

| LIGHT EMITTING PULSE CONTROL SIGNAL | SF1 | SF2 | SF3 | SF4 | SF5 | SF6 | SF7 | SF8 | NUMBER OF LIGHT EMITTING PULSES TOTAL |
|---|---|---|---|---|---|---|---|---|---|
| LIGHT EMITTING FORMAT A | 5 | 10 | 20 | 40 | 80 | 160 | 320 | 640 | 1275 |
| LIGHT EMITTING FORMAT B | 4 | 8 | 16 | 32 | 64 | 128 | 256 | 512 | 1020 |
| LIGHT EMITTING FORMAT C | 3 | 6 | 12 | 24 | 48 | 96 | 192 | 384 | 765 |
| LIGHT EMITTING FORMAT D | 2 | 4 | 8 | 16 | 32 | 64 | 128 | 256 | 510 |
| LIGHT EMITTING FORMAT E | 1 | 2 | 4 | 8 | 16 | 32 | 64 | 128 | 255 |

FIG. 11

| | | | | |
|---|---|---|---|---|
| 0.5 | 0.5 | 0.5 | 0.5 | 0.5 |
| 0.5 | 1 | 1 | 1 | 0.5 |
| 0.5 | 1 | 1 | 1 | 0.5 |
| 0.5 | 1 | 1 | 1 | 0.5 |
| 0.5 | 0.5 | 0.5 | 0.5 | 0.5 |

FIG. 12

| | | | | |
|---|---|---|---|---|
| 0.5 | 0.5 | 0.5 | 0.5 | 0.5 |
| 0.5 | 0.75 | 0.75 | 0.75 | 0.5 |
| 0.5 | 0.75 | 1 | 0.75 | 0.5 |
| 0.5 | 0.75 | 0.75 | 0.75 | 0.5 |
| 0.5 | 0.5 | 0.5 | 0.5 | 0.5 |

FIG. 16

(a)

| | | | | |
|---|---|---|---|---|
| 0 | 0 | 20 | 0 | 0 |
| 0 | | | | 0 |
| 20 | | | | 20 |
| 0 | | | | 0 |
| 0 | 0 | 20 | 0 | 0 |

(b)

| | | | | |
|---|---|---|---|---|
| 1 | 1 | 0.5 | 1 | 1 |
| 1 | | | | 1 |
| 0.5 | | | | 0.5 |
| 1 | | | | 1 |
| 1 | 1 | 0.5 | 1 | 1 |

FIG. 17

(a)

| | | | | |
|---|---|---|---|---|
| 0 | 0 | 20 | 0 | 0 |
| 0 | | | | 0 |
| 20 | | | | 20 |
| 0 | | | | 0 |
| 0 | 0 | 20 | 0 | 0 |

(b)

| | | | | |
|---|---|---|---|---|
| 0 | 10 | 20 | 10 | 0 |
| 10 | | | | 10 |
| 20 | | | | 20 |
| 10 | | | | 10 |
| 0 | 10 | 20 | 10 | 0 |

(c)

| | | | | |
|---|---|---|---|---|
| 1 | 0.75 | 0.5 | 0.75 | 1 |
| 0.75 | | | | 0.75 |
| 0.5 | | | | 0.5 |
| 0.75 | | | | 0.75 |
| 1 | 0.75 | 0.5 | 0.75 | 1 |

FIG. 20

(a)

| | | | | |
|---|---|---|---|---|
| 17 | 18 | 20 | 15 | 17 |
| 15 | | | | 17 |
| 12 | | | | 12 |
| 8 | | | | 10 |
| 18 | 15 | 16 | 5 | 8 |

UR

DR (b)

| | | | | |
|---|---|---|---|---|
| 7 | 8 | 10 | 5 | 7 |
| 5 | | | | 7 |
| 7 | | | | 7 |
| 3 | | | | 5 |
| 13 | 10 | 11 | 0 | 3 |

(c)

| | | | | |
|---|---|---|---|---|
| 13 | 13 | 13 | 13 | 13 |
| 13 | | | | 13 |
| 13 | | | | 13 |
| 13 | | | | 13 |
| 13 | 13 | 13 | 13 | 13 |

DISPLAY DEVICE AND LUMINANCE CONTROL METHOD THEREFOR

Matter enclosed in heavy brackets [ ] appears in the original patent but forms no part of this reissue specification; matter printed in italics indicates the additions made by reissue.

CROSS REFERENCE TO RELATED APPLICATIONS

This is a divisional of U.S. application Ser. No. 09/856,161, filed Jul. 31, 2001, *now U.S. Pat. No. 6,414,660* which was the National Stage of International Application No. PCT/JP00/06212, filed Sep. 11, 2000, the contents of which are expressly incorporated by reference herein in their entireties. The International Application was not published under PCT Article 21(2) in English.

TECHNICAL FIELD

The present invention relates to a display device for displaying an image with luminance corresponding to a video signal inputted from the exterior and a luminance control method therefor.

BACKGROUND ART

Plasma display devices using PDPs (Plasma Display Panels) have the advantage that thinning and larger screens are possible. In the plasma display devices, images are displayed by utilizing light emission in cases where discharge cells composing pixels are discharged. As light is thus emitted, heat is generated on a glass surface composing the PDP, so that the higher the luminance of an image becomes, the larger the amount of heat generation becomes. Therefore, the temperature of the glass surface is raised. In the worst case, the glass surface is damaged.

In order to solve the above-mentioned problem, an example of a conventional display device is a display device disclosed in JP-A-11-194745. In the display device, the whole surface of a display screen is divided into a plurality of blocks, temperature estimated values are calculated with respect to all the blocks, and the maximum value of the calculated estimated temperatures is compared with a reference temperature to produce a luminance correction coefficient. The luminance of the display screen is controlled by the luminance correction coefficient.

A display on which an image is displayed is generally fixed in its outer periphery. Damage to the display caused by the rise in the temperature with the increase in the luminance may occur in the vicinity of the outer periphery of the display in most cases. That is, the damage to the display depends on the temperature difference rather than the maximum temperature. Generally, the temperature difference between the outer periphery of the display where no heat is generated and the outer periphery of the display screen of the display where heat is generated is the largest. The display may be damaged by thermal stress created by the temperature difference in many cases.

In the conventional display device, however, only when the maximum value of the estimated temperatures reaches not less than the reference temperature, that is, when the temperature of any portion on the display screen exceeds its certain upper-limit value, the luminance is controlled. Therefore, the luminance cannot be always controlled when excessive thermal stress is exerted on the outer periphery, which is most easily damaged, of the display, thereby making it impossible to reliably prevent the display from being damaged.

In the conventional display device, the whole of the display screen is divided into a plurality of blocks, and the estimated temperatures are calculated with respect to all the blocks. Accordingly, operation processing becomes complicated, and long time is required to perform the operation processing. Particularly in recent years, it has been desired to make a display image highly precise. The number of pixels composing the display screen, that is, the number of discharge cells has tended to be increased. In this case, the above-mentioned operation processing has increasingly become complicated, and the processing time is lengthened.

DISCLOSURE OF INVENTION

An object of the present invention is to provide a display device capable of more reliably preventing a display from being damaged and a luminance control method therefor.

Another object of the present invention is to provide a display device capable of more reliably preventing a display from being damaged in a small amount of operation and a luminance control method therefor.

A display device according to an aspect of the present invention comprises a display for displaying an image with luminance corresponding to a video signal inputted from the exterior; a temperature estimation circuit for estimating from the video signal a temperature estimated value corresponding to the temperature of a display screen of the display; an operation circuit for finding a temperature difference estimated value using a reference value corresponding to the temperature of the outer periphery of the display and the temperature estimated value; and a control circuit for controlling the luminance of the image displayed on the display on the basis of the temperature difference estimated value.

In the display device, the temperature estimated value corresponding to the temperature of the display screen of the display is estimated from the video signal, and the temperature difference estimated value is found using the temperature estimated value and the reference value corresponding to the temperature of the outer periphery of the display, to control the luminance of the image displayed on the display on the basis of the temperature difference estimated value. Generally, the display on which the image is displayed is fixed in its outer periphery. Accordingly, damage to the display caused by the rise in the temperature with the increase in the luminance may occur in the vicinity of the outer periphery of the display in most cases. Therefore, the luminance is controlled depending on the temperature difference estimated value found from the temperature estimated value corresponding to the temperature of the display screen and the temperature of the outer periphery of the display, as described above, so that the luminance can be controlled on the basis of the temperature difference between the outer periphery of the display which most greatly affects the damage to the display and the display screen, thereby making it possible to more reliably prevent the display from being damaged.

It is preferable that the temperature estimation circuit estimates the temperature estimated value corresponding to the temperature of the outer periphery of the display screen of the display.

In this case, the temperature difference estimated value corresponding to the temperature of the outer periphery of the display screen of the display is estimated from the video signal, and the temperature difference estimated value is found using the temperature estimated value and the reference value corresponding to the temperature of the outer periphery of the display, to control the luminance of the image displayed on the display on the basis of the temperature difference estimated value. The temperature difference estimated value is found from the temperature estimated value corresponding to the temperature of the outer periphery of the display screen and the reference value corresponding to the temperature of the outer periphery of the display. Accordingly, the luminance can be controlled on the basis of the temperature difference between the outer periphery of the display which greatly affects the damage to the display and the outer periphery of the display screen closest to the outer periphery, thereby making it possible to more reliably prevent the display from being damaged. Further, the temperature estimated value operated in order to find the temperature difference value is limited to the temperature estimated value for the outer periphery of the display screen of the display. Accordingly, the amount of operation is made smaller than that in a case where the temperature estimated value on the whole of the display screen, so that the processing is simplified, and the processing time is shortened. As a result, it is possible to more reliably prevent the display from being damaged in a small amount of operation.

It is preferable that the display comprises first and second boards between which a plurality of light emitting elements are formed and to which its outer periphery is fixed, and the outer periphery of the display includes a portion between the light emitting element positioned in the outermost periphery out of the plurality of light emitting elements and a fixed portion of the first and second boards.

In this case, the reference value corresponds to the temperature of the portion between the light emitting element positioned in the outermost periphery and the fixing portion of the first and second boards. Accordingly, the luminance can be controlled using as a basis the temperature of the portion most easily damaged, thereby making it possible to more reliably prevent the display from being damaged.

It is preferable that the temperature estimation circuit estimates the temperature estimated value by integrating data relating to the luminance from the video signal and subtracting the amount of dissipated heat therefrom, and the operation circuit subtracts the reference value from the temperature estimated value, to find the temperature difference estimated value.

In this case, the data relating to the luminance is integrated from the video signal, and the amount of dissipated heat is subtracted therefrom, thereby making it possible to find the temperature estimated value corresponding to the truer temperature. Consequently, the luminance is controlled on the basis of the temperature difference estimated value obtained by subtracting the reference value from the temperature estimated value. Accordingly, it is possible to control the luminance with higher precision to more reliably prevent the display from being damaged.

It is preferable that the control circuit lowers the luminance of the image displayed on the display with the increase in the temperature difference estimated value.

In this case, the luminance is lowered with the increase in the temperature difference estimated value, thereby making it possible to more reliably prevent the display from being damaged.

It is preferable that the control circuit lowers the maximum luminance of the image displayed on the display with the increase in the temperature difference estimated value.

In this case, the maximum luminance is lowered with the increase in the temperature difference estimated value, thereby making it possible to more reliably prevent the display from being damaged as well as making it possible to display, when the luminance other than the maximum luminance is displayed as it is, a good image corresponding to the luminance of the video signal itself.

It is preferable that the display displays the image with a gray scale corresponding to the video signal out of a plurality of gray scales, and the control circuit lowers the luminance of the image displayed on the display at the same ratio for each of the gray scales.

In this case, the luminance is lowered at the same ratio for each gray scale, thereby making it possible to lower the luminance of the display without giving a visually uncomfortable feeling to a viewer.

It is preferable that the display displays the image with a gray scale corresponding to the video signal using a plurality of light emitting formats which are the same in the total number of gray scales and differ in the number of light emitting pulses on each of the gray scales, and the control circuit controls the luminance of the image displayed on the display using the light emitting format selected depending on the temperature difference estimated value out of the plurality of light emitting formats.

In this case, the luminance can be controlled by switching the plurality of light emitting formats in the order of their decreasing numbers of light emitting pulses on the same gray scale with the increase in the temperature difference estimated value, thereby making it possible to lower the luminance without greatly changing the total number of gray scales.

It is preferable that the control circuit divides the display screen of the display into a plurality of blocks, extracts from the plurality of blocks the peripheral block adjacent to the outer periphery of the display screen, and lowers the luminance of the peripheral block.

In this case, the luminance of the peripheral block adjacent to the outer periphery of the display screen is lowered. Accordingly, the image in the block inside the display screen can be displayed with the luminance of the video signal itself, thereby making it possible to provide a display screen having no visually uncomfortable feeling by the viewer as well as to more reliably prevent the outer periphery of the display from being damaged.

It is preferable that the control circuit divides a display screen of the display into a plurality of blocks, extracts from the plurality of blocks the peripheral block adjacent to the outer periphery of the display screen, and makes the luminance of the peripheral block lower than that of the block inside the display screen of the display.

In this case, the luminance of the peripheral block is made lower than that of the block inside the display screen. Accordingly, the luminance of the display screen is smoothly changed, thereby making it possible to provide a display screen having no visually uncomfortable feeling by the viewer as well as to more reliably prevent the outer periphery of the display from being damaged.

It is preferable that the display device further comprises a block extraction circuit for dividing the display screen of the display into a plurality of blocks and extracting from the plurality of blocks the peripheral blocks adjacent to the outer periphery of the display screen, the temperature estimation circuit estimates the temperature estimated values for the peripheral blocks, the operation circuit finds a peripheral block temperature difference estimated value from the temperature estimated values estimated for the peripheral blocks, and the control circuit controls the luminance for each of the peripheral blocks on the basis of the peripheral block temperature difference estimated value.

In this case, the display screen is divided into the plurality of blocks, and the luminance is controlled for each of the peripheral blocks adjacent to the outer periphery of the display screen. Accordingly, the luminance can be controlled more finely, thereby making it possible to provide a display screen having no visually uncomfortable feeling by the viewer as well as to more reliably prevent the outer periphery of the display from being damaged.

It is preferable that the control circuit controls the luminance for each of the peripheral blocks such that the amount of controlled luminance between the adjacent peripheral blocks is smoothly changed on the basis of the peripheral block temperature difference estimated value.

In this case, the amount of controlled luminance between the adjacent peripheral blocks is smoothly changed. Accordingly, a display screen having no visually uncomfortable feeling can be provided for the viewer, and thermal stress created in the outer periphery of the display is smoothly changed, thereby making it possible to more reliably prevent the display from being damaged.

It is preferable that the display device further comprises a block extraction circuit for dividing the display screen of the display into a plurality of blocks and extracting from the plurality of blocks the peripheral blocks adjacent to the outer periphery of the display screen, the temperature estimation circuit estimates the temperature estimated values for the peripheral blocks, the operation circuit finds, out of the temperature estimated values estimated for the peripheral blocks, peripheral block temperature difference estimated values for the peripheral blocks, and extracts from the peripheral block temperature difference estimated values the maximum peripheral block temperature difference estimated value, and the control circuit controls the luminance of the image displayed on the display on the basis of the maximum peripheral block temperature difference estimated value.

In this case, the luminance is controlled using the maximum peripheral block temperature difference estimated value representing the largest temperature difference in the peripheral blocks, thereby making it possible to more reliably prevent the display from being damaged. Further, the luminance is controlled by the maximum peripheral block temperature difference estimated value, thereby simplifying processing for controlling the luminance.

It is preferable that the reference value includes a plurality of reference values which differ depending on the position of the outer periphery of the display.

In this case, the luminance of the image displayed on the display can be controlled using the plurality of reference values which differ depending on the position of the outer periphery of the display. Accordingly, a high reference value is set in a portion where the temperature is easily raised, while a low reference value is set in a portion where the temperature is not easily raised, thereby making it possible to control the luminance on the basis of each of the reference values. As a result, the display can be more reliably prevented from being damaged, and the luminance is not lowered any more than necessary.

It is preferable that the display device further comprises a measurement circuit for measuring the temperature of the outer periphery of the display and outputting to the operation circuit the reference value corresponding to the measured temperature.

In this case, the temperature of the outer periphery of the display is directly measured, thereby making it possible to control the luminance on the basis of the reference value corresponding to the temperature. Even when the reference value is changed by the variation in outside air temperature, for example, it is possible to reliably prevent the display from being damaged.

A luminance control method for a display device according to another aspect of the present invention is a luminance control method for a display device comprising a display for displaying an image with luminance corresponding to a video signal inputted from the exterior, characterized by comprising the steps of estimating from the video signal a temperature estimated value corresponding to the temperature of a display screen of the display; finding a temperature difference estimated value using a reference value corresponding to the temperature of the outer periphery of the display and the temperature estimated value; and controlling the luminance of the image displayed on the display on the basis of the temperature difference estimated value.

In the luminance control method for the display device, the temperature estimated value corresponding to the temperature of the display screen of the display is estimated from the video signal, and the temperature difference estimated value is found using the temperature estimated value and the reference value corresponding to the temperature of the outer periphery of the display, to control the luminance of the image displayed on the display on the basis of the temperature difference estimated value. Generally, the display on which the image is displayed is fixed in its outer periphery. The damage to the display caused by the increase in the luminance may occur in the vicinity of the outer periphery of the display in most cases. Consequently, the luminance is controlled depending on the temperature difference estimated value found from the temperature estimated value corresponding to the temperature of the display screen and the reference value corresponding to the temperature of the outer periphery of the display, thereby making it possible to control the luminance on the basis of the temperature difference between the outer periphery of the display which most greatly affects the damage to the display and the display screen and to more reliably prevent the display from being damaged.

It is preferable that the temperature estimating step comprises the step of estimating the temperature estimated value corresponding to the temperature of the outer periphery of the display screen of the display.

In this case, the temperature estimated value corresponding to the temperature of the outer periphery of the display screen of the display is estimated from the video signal, and the temperature difference estimated value is found using the temperature estimated value and the reference value corresponding to the temperature of the outer periphery of the display, to control the luminance of the image displayed on the display on the basis of the temperature difference estimated value. The temperature difference estimated value is found from the temperature estimated value corresponding to the temperature of the outer periphery of the display screen and the reference value corresponding to the temperature of the outer periphery of the display. Accordingly, the luminance can be controlled on the basis of the temperature difference between the outer periphery of the display which most greatly affects the damage to the display and the outer periphery of the display screen closest to the outer periphery of the display, thereby making it possible to more reliably prevent the display from being damaged. Further, the temperature estimated value operated in order to find the temperature difference estimated value is limited to the temperature estimated value for the outer periphery of the display screen of the display. Accordingly, the amount of operation is made smaller than that in a case where the temperature estimated value on the whole of the display screen is operated, so that the processing is simplified, and the processing time is shortened. As a result, it is possible to more reliably prevent the display from being damaged in a small amount of operation.

It is preferable that the display displays the image on a gray scale corresponding to the video signal using a plurality of light emitting formats which are the same in the total number of gray scales and differ in the number of light emitting pulses on each of the gray scales, and the controlling step comprises the step of controlling the luminance of the image displayed on the display using the light emitting format selected depending on the temperature difference estimated value out of the plurality of light emitting formats.

In this case, the luminance can be controlled by switching the plurality of light emitting formats in the order of their decreasing numbers of light emitting pulses on the same gray scale with the increase in the temperature difference estimated value, thereby making it possible to lower the luminance without greatly changing the total number of gray scales.

It is preferable that the controlling step comprises the step of dividing the display screen of the display into a plurality of blocks, extracting from the plurality of blocks the peripheral blocks adjacent to the outer periphery of the display screen, and lowering the luminance of the peripheral blocks.

In this case, the luminance of the peripheral blocks adjacent to the outer periphery of the display screen is lowered. Accordingly, the image in the block inside the display screen can be displayed with the luminance of the video signal itself, thereby making it possible to provide a display screen having no visually uncomfortable feeling by the viewer as well as to more reliably prevent the outer periphery of the display from being damaged.

It is preferable that the luminance control method for the display device further comprises the step of dividing the display screen of the display into a plurality of blocks and extracting from the plurality of blocks the peripheral blocks adjacent to the outer periphery of the display screen, the temperature estimating step comprises the step of estimating the temperature estimated values for the peripheral blocks, the temperature difference estimated value operating step comprises the step of finding a peripheral block temperature difference estimated value from the temperature estimated values estimated for the peripheral blocks, and the controlling step comprises the step of controlling the luminance for each of the peripheral blocks on the basis of the peripheral block temperature difference estimated value.

In this case, the display screen is divided into the plurality of blocks, and the luminance is controlled for each of the peripheral blocks adjacent to the outer periphery of the display screen. Accordingly, the luminance can be controlled more finely, thereby making it possible to provide a display screen having no visually uncomfortable feeling by the viewer as well as to more reliably prevent the outer periphery of the display from being damaged.

BRIEF DESCRIPTION OF DRAWINGS

FIG. 6 is a diagram showing sub-fields used for each gray scale level in a case where an image is displayed on 256 gray scales.

FIG. 7 is a diagram showing the respective numbers of light emitting pulses in each sub-field in different light emitting formats.

FIG. 11 is a diagram for explaining a second luminance control method for the plasma display device shown in FIG. 1.

FIG. 12 is a diagram for explaining a third luminance control method for the plasma display device shown in FIG. 1.

FIG. 16 is a diagram showing an example of a peripheral block temperature difference estimated value and a multiplication factor by a first luminance control method for the plasma display device shown in FIG. 13.

FIG. 17 is a diagram showing an example of a peripheral block temperature difference estimated value, a peripheral block temperature difference estimated value after filtering processing, and a multiplication factor by a second luminance control method for the plasma display device shown in FIG. 13.

FIG. 20 is a diagram showing an example of a temperature difference estimated value, a peripheral block temperature difference estimated value, and a maximum peripheral block temperature difference estimated value which are estimated for each peripheral block.

BEST MODE FOR CARRYING OUT THE INVENTION

An AC-type plasma display device will be described as an example of a display device according to the present invention. A display device to which the present invention is applied is not particularly limited to the AC-type plasma display device. The present invention is similarly applicable to another display device, provided that the temperature of a display screen is changed by a change in luminance.

Figure 1:
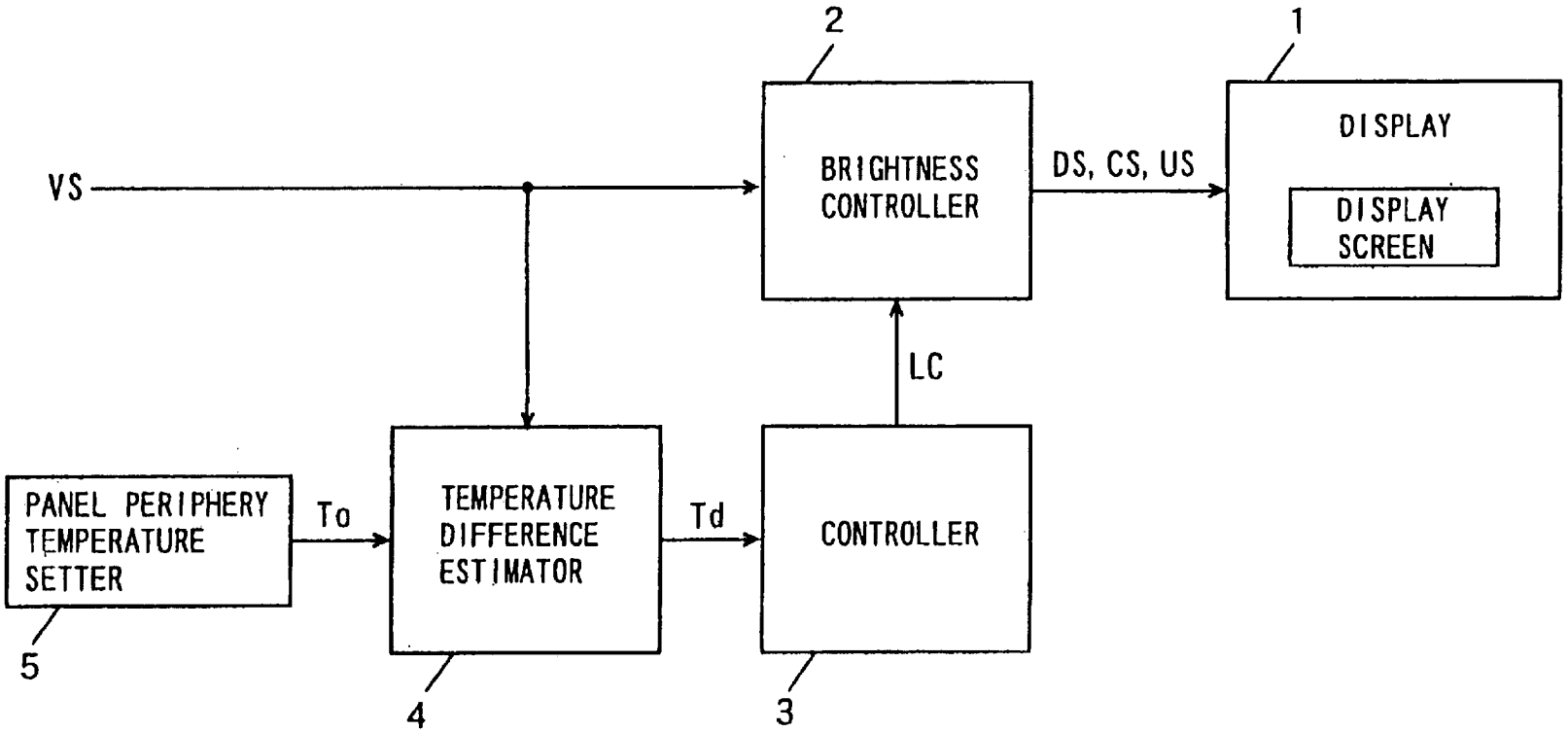
FIG. 1 is a block diagram showing the configuration of a plasma display device according to a first embodiment of the present invention.

A plasma display device according to a first embodiment of the present invention will be first described. FIG. 1 is a block diagram showing the configuration of the plasma display device according to the first embodiment of the present invention.

The plasma display device shown in FIG. 1 comprises a display 1, a brightness controller 2, a controller 3, a temperature difference estimator 4, and a panel periphery temperature setter 5.

A video signal VS is inputted to the brightness controller 2 and the temperature difference estimator 4. The panel periphery temperature setter 5 sets a reference value To representing the temperature of the panel outer periphery of the display 1, and outputs the reference value To to the temperature difference estimator 4. The temperature difference estimator 4 calculates a temperature difference estimated value Td representing the difference between the temperature of the panel outer periphery of the display 1 and the temperature of the display screen of the display 1 using the video signal VS and the reference value To, and outputs the temperature difference estimated value Td to the controller 3.

The controller 3 outputs to the brightness controller 2 a brightness control signal LC for controlling the luminance of the display screen of the display 1 depending on the temperature difference estimated value Td. The brightness controller 2 outputs to the display 1 a data driver driving control signal DS, a scan driver driving control signal CS, and a sustain driver driving control signal US for displaying an image with luminance corresponding to the brightness control signal LC.

Figure 2:
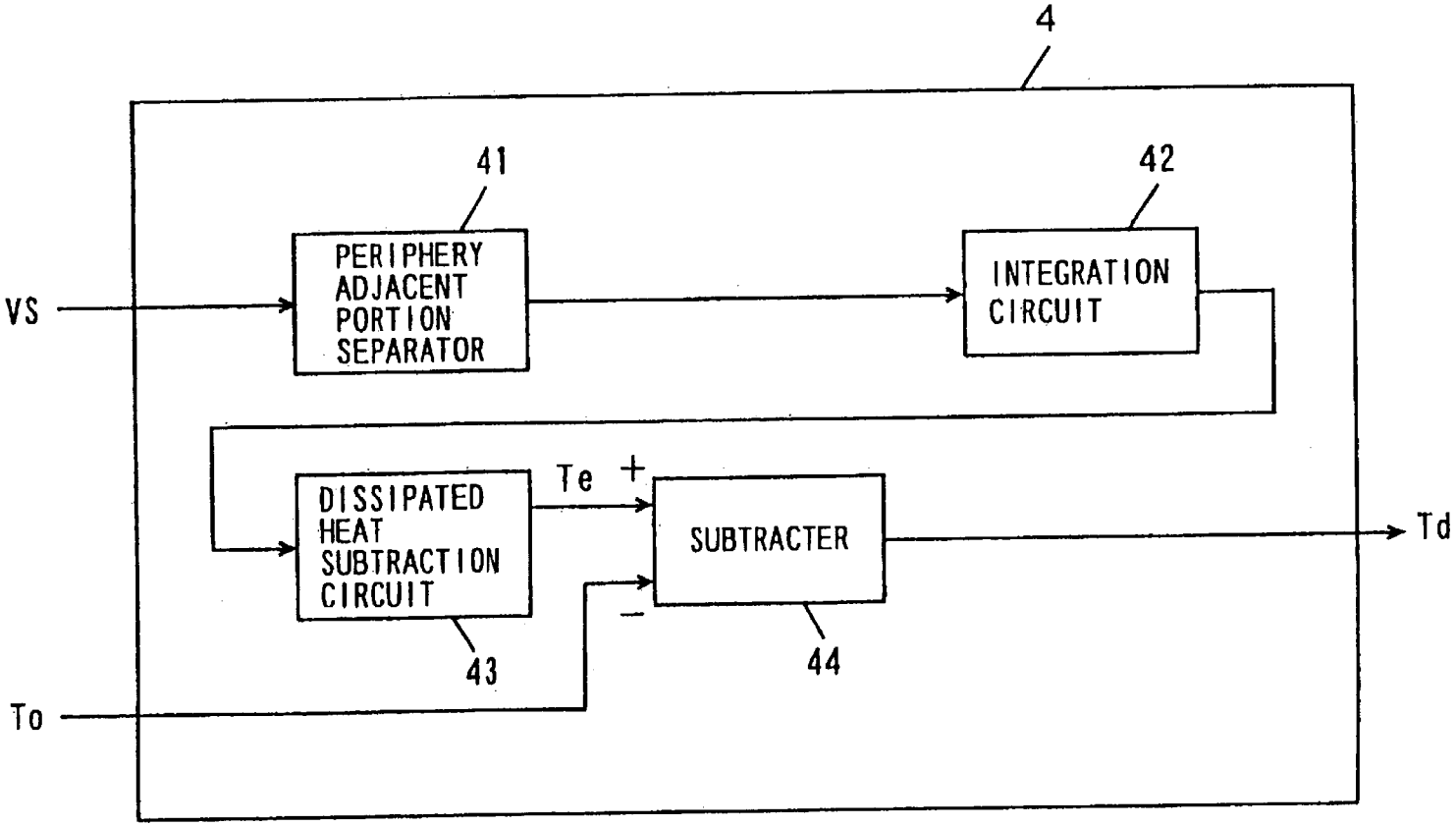
FIG. 2 is a block diagram showing the configuration of a temperature difference estimator shown in FIG. 1.

FIG. 2 is a block diagram showing the configuration of the temperature difference estimator 4 shown in FIG. 1. As shown in FIG. 2, the temperature difference estimator 4 comprises a periphery adjacent portion separator 41, an integration circuit 42, a dissipated heat subtraction circuit 43, and a subtracter 44.

The periphery adjacent portion separator 41 receives the video signal VS, separates from the video signal VS a portion of a periphery adjacent portion adjacent to the outer periphery of the display screen of the display 1 from the video signal VS and outputs the separated portion to the integration circuit 42. The video signal VS includes not only an inherent video signal but also a vertical synchronizing signal, a horizontal synchronizing signal, and so forth. The periphery adjacent portion is separated using the horizontal synchronizing signal, the vertical synchronizing signal, and so forth.

The integration circuit 42 integrates data relating to luminance from the video signal for the periphery adjacent portion separated by the periphery adjacent portion separator 41, for example, a luminance signal for the periphery adjacent portion, and outputs the integrated luminance signal to the dissipated heat subtraction circuit 43.

The dissipated heat subtraction circuit 43 subtracts the amount of dissipated heat from the integrated luminance signal for the periphery adjacent portion to calculate a temperature estimated value Te representing the temperature of the periphery adjacent portion, and outputs the temperature estimated value Te to the subtracter 44.

The subtracter 44 subtracts the reference value To for the panel outer periphery from the temperature estimated value Te for the periphery adjacent portion to find a temperature difference estimated value Td for the outer periphery of the display screen, and outputs the temperature difference estimated value Td to the controller 3.

The controller 3 selects, out of a plurality of light emitting formats, the corresponding light emitting format depending on the temperature difference estimated value Td found by the processing, generates a brightness control signal LC including a light emitting pulse control signal EC for designating the selected light emitting format and a multiplication factor k in the selected light emitting format, and outputs the generated brightness control signal LC to the brightness controller 2.

Figure 3:
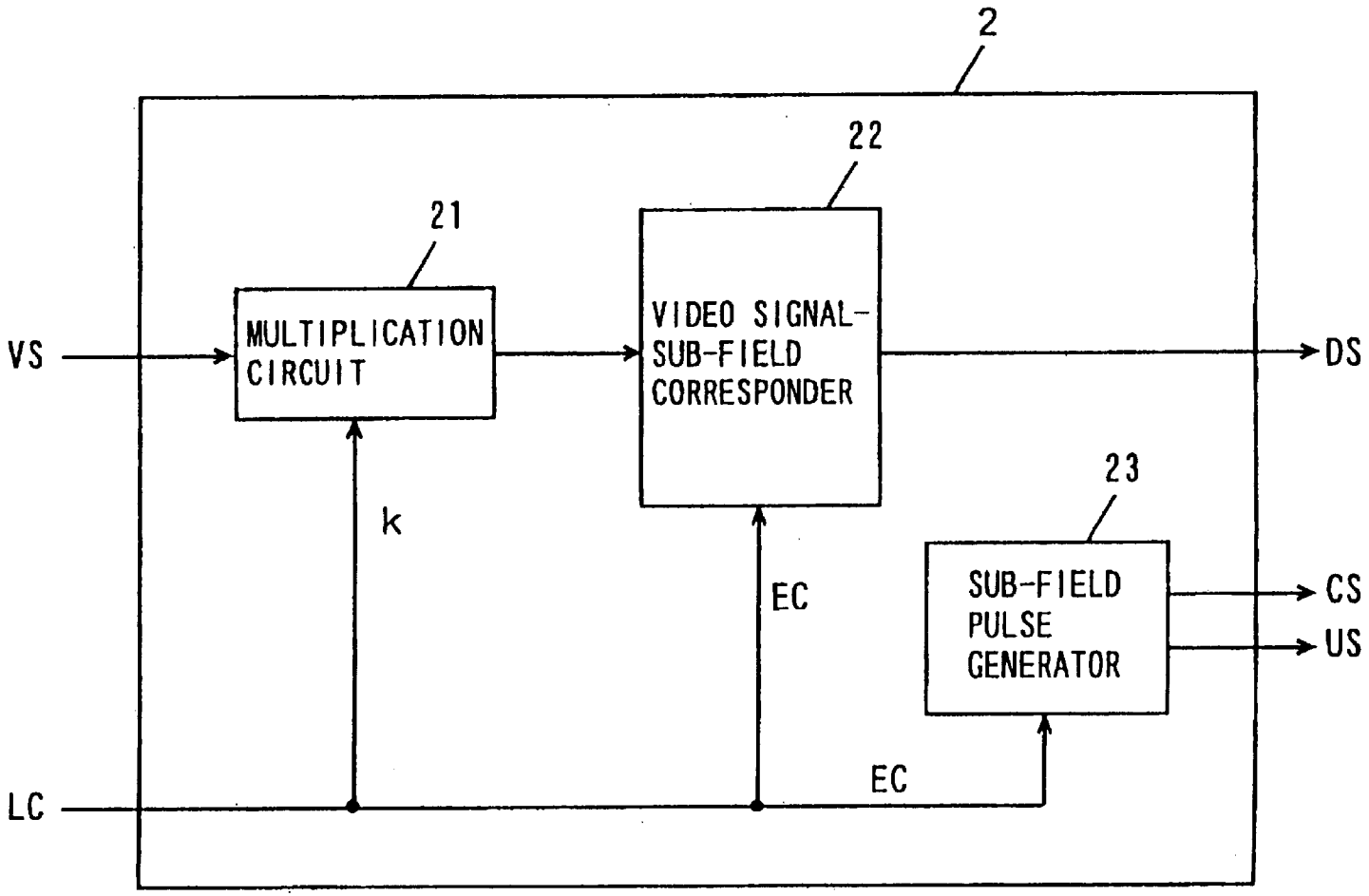
FIG. 3 is a block diagram showing the configuration of a brightness controller shown in FIG. 1.

FIG. 3 is a block diagram showing the configuration of the brightness controller 2 shown in FIG. 1. As shown in FIG. 3, the brightness controller 2 comprises a multiplication circuit 21, a video signal/sub-field corresponder 22, and a sub-field pulse generator 23.

The multiplication circuit 21 multiplies the video signal VS by the multiplication factor k included in the brightness control signal LC, and outputs to the video signal/sub-field corresponder 22 a video signal whose luminance has been controlled by the multiplication factor k.

The video signal/sub-field corresponder 22 divides one field into a plurality of sub-fields to perform display. Accordingly, it generates from a video signal corresponding to one field image data from each sub-field in the light emitting format designated from the plurality of light emitting formats in response to the light emitting pulse control signal EC included in the brightness control signal LC, and outputs a data driver driving control signal DC corresponding to the image data for each sub-field to the display 1.

The sub-field pulse generator 23 outputs to the display 1 the scan driver driving control signal CS and the sustain driver driving control signal US which correspond to each sub-field in the light emitting format designated from the plurality of light emitting formats in response to the light emitting pulse control signal EC included in the brightness control signal LC.

Figure 4:
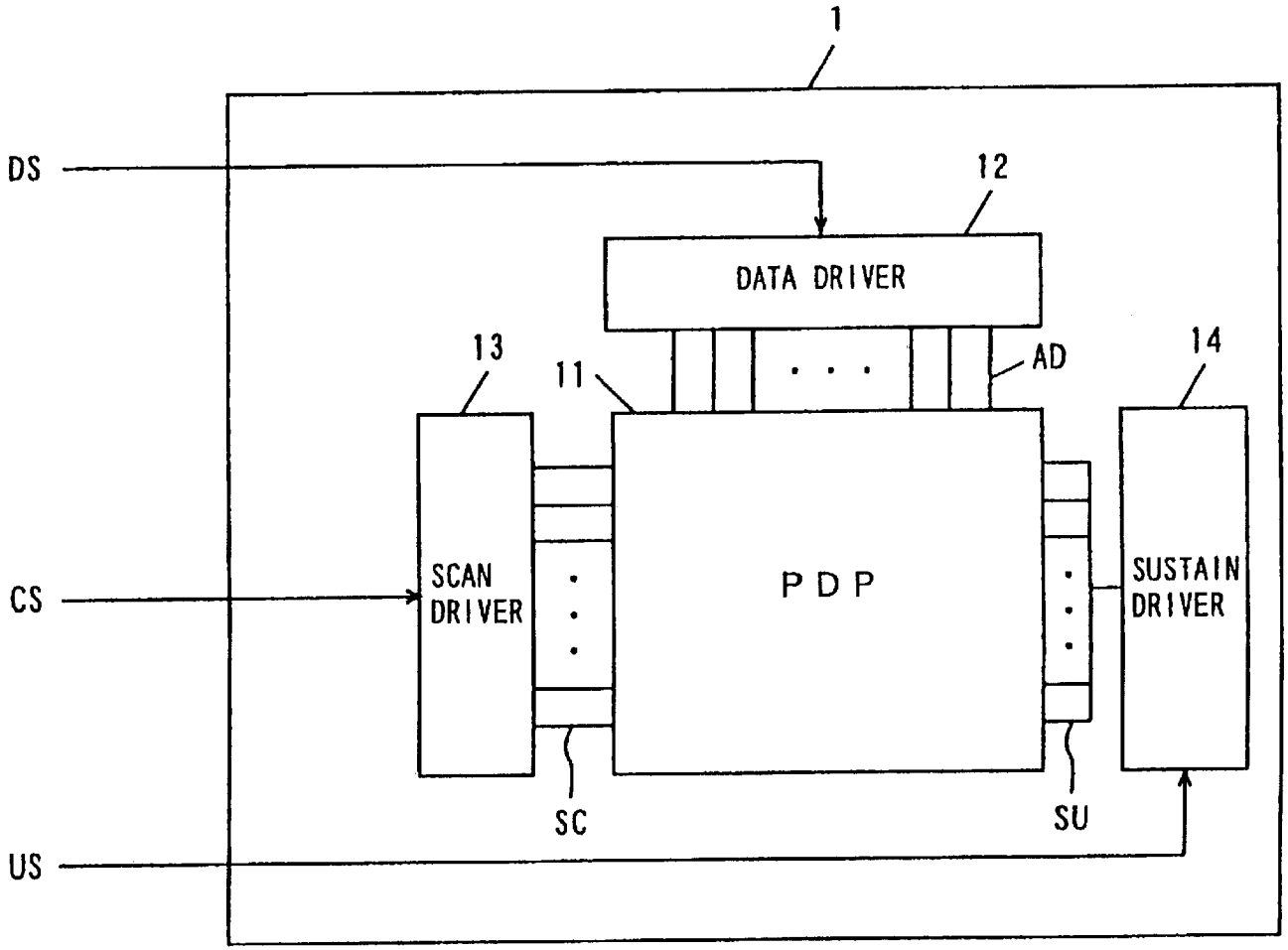
FIG. 4 is a block diagram showing the configuration of a display shown in FIG. 1.

FIG. 4 is a block diagram showing the configuration of the display 1 shown in FIG. 1. The display shown in FIG. 1 comprises a PDP (Plasma Display Panel) 11, a data driver 12, a scan driver 13, and a sustain driver 14.

The data driver 12 is connected to a plurality of address electrodes (data electrodes) AD in the PDP 11. The scan driver 13 contains driving circuits respectively provided for scan electrodes SC in the PDP 11, and each of the driving circuits is connected to the corresponding scan electrode SC. The sustain driver 14 is together connected to a plurality of sustain electrodes SU in the PDP 11.

The data driver 12 applies a write pulse to the corresponding address electrode AD in the PDP 11 during a write time period in accordance with the data driver driving control signal DS. On the other hand, the scan driver 13 successively applies the write pulses to the plurality of scan electrodes SC in the PDP 11 while shifting a shift pulse in the vertical scanning direction during the write time period in accordance with the scan driver driving control signal CS. Consequently, address discharges are induced in the corresponding discharge cell, and the discharge cell corresponding to the video signal VS is selected.

The scan driver 13 applies periodical sustain pulses to the plurality of scan electrodes SC in the PDP 11 during a sustain time period in accordance with the scan driver driving control signal CS. On the other hand, the sustain driver 14 simultaneously applies sustain pulses which are shifted in phase by 180° from the sustain pulses applied to the scan electrodes SC in the sustain time period in accordance with the sustain driver driving control signal US. Consequently, sustain discharges are induced in the discharge cell selected in an address time period, and an image is displayed on the display screen with luminance corresponding to the video signal VS.

Figure 5:
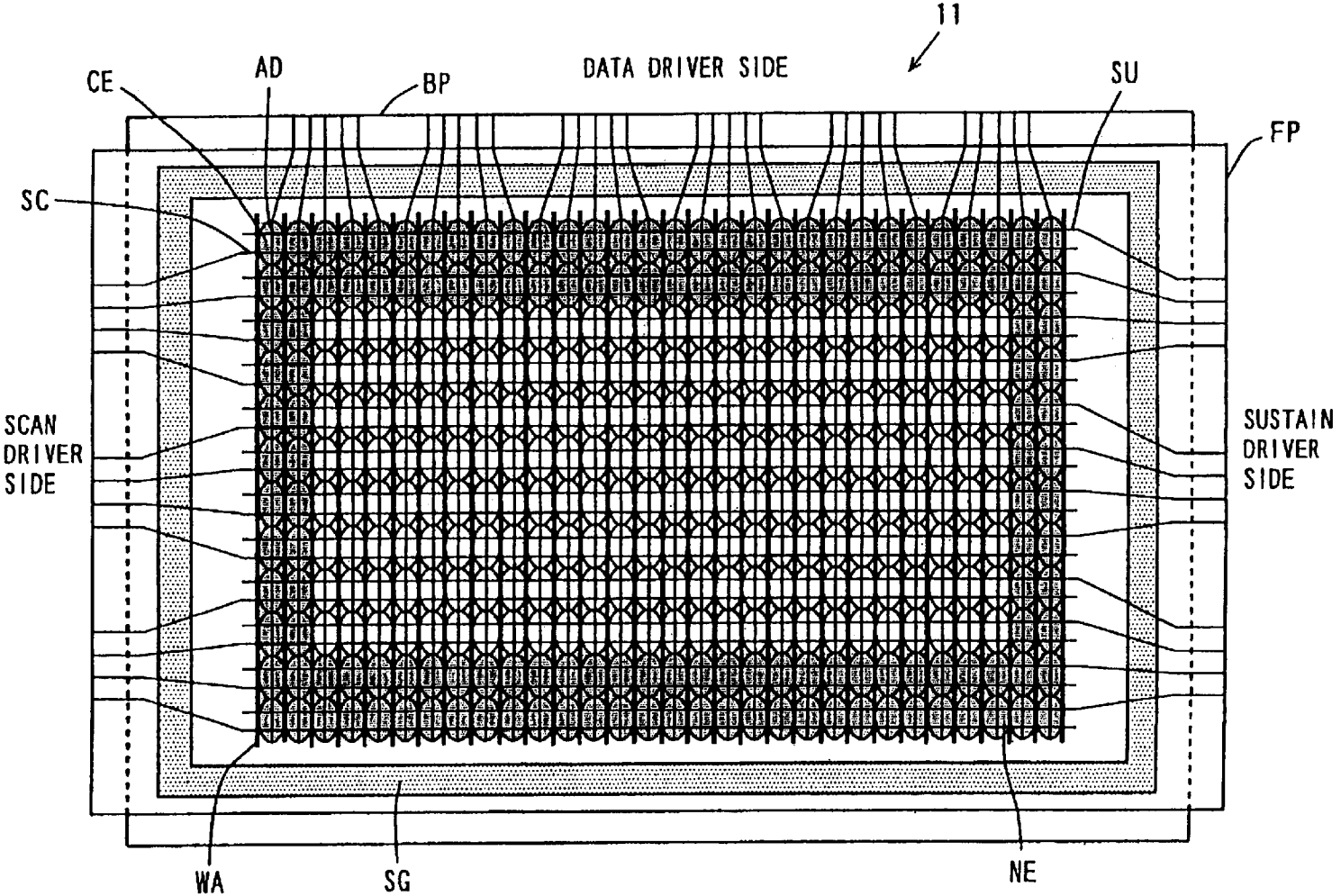
FIG. 5 is a schematic view showing the configuration of a PDP shown in FIG. 4.

FIG. 5 is a schematic view showing the configuration of the PDP 11 shown in FIG. 4. As shown in FIG. 5, the PDP 11 comprises a plurality of address electrodes AD, a plurality of scan electrodes SC, a plurality of sustain electrodes SU, a surface glass board FP, a reverse glass board BP, and a barrier wall WA.

The plurality of address electrodes AD are arranged in the vertical direction of the screen, and the plurality of scan electrodes SC and the plurality of sustain electrodes SU are arranged in the horizontal direction on the screen. Further, the sustain electrodes SU are together connected. A discharge cell CE is formed at each of the intersections of the address electrodes AD, the scan electrodes SC, and the sustain electrodes SU. Each of the discharge cells CE composes a pixel on the screen.

Furthermore, the scan electrodes SC and the sustain electrodes SU are formed in the horizontal direction on the screen such that they are paired on the surface glass board FP, and are covered with a transparent dielectric layer and a protective layer. On the other hand, the address electrodes AD are formed in the vertical direction on the screen on the reverse glass board BP opposite to the surface glass board FP, a transparent dielectric layer is formed thereon, and a fluorescent member is further applied thereon. The barrier wall WA is provided between the address electrodes AD, so that the adjacent discharge cells CE are separated from each other. When color display is performed, the address electrodes AD are provided every R, G, and B, and the barrier wall WA is provided between the address electrodes AD.

The surface glass board FP and the reverse glass board BP are fixed with their outer peripheries joined to each other by a sealing glass SG. When the temperatures of the surface glass board FP and the reverse glass board BP are raised by causing the display cells CE to emit light, cracks occur in the vicinity of the sealing glass SG for the surface glass board FP and the reverse glass board BP. Consequently, the PDP 11 may be damaged in many cases. In the present embodiment, the luminance of the PDP 11 is controlled on the basis of the temperature difference in the portion most easily damaged. Therefore, the temperature difference estimated value Td is found in the following manner.

A portion, including at least the discharge cells CE positioned in the outermost periphery (for example, a square frame portion indicated by hatching), of the display screen of the PDP 11, that is, a portion where the discharge cells CE are formed is taken as a periphery adjacent portion NE, to separate a video signal in the region by the periphery adjacent portion separator 41 in the temperature difference estimator 4. The separated video signal is integrated, for example, by the integration circuit 42 and the dissipated heat subtraction circuit 43, to find a temperature estimated value Te representing the temperature of the periphery adjacent portion NE.

On the other hand, the panel periphery temperature setter 5 takes a portion of the sealing glass SG for the surface glass board FP and the reverse glass board BP and a portion between the discharge cell CE positioned in the outermost periphery and the sealing glass SG as the panel outer periphery, and sets the temperature of the portion as a reference value To. Consequently, the reference value To for the panel outer periphery is subtracted from the temperature estimated value Te for the periphery adjacent portion NE, thereby operating the temperature difference estimated value Td for the outer periphery of the display screen. Consequently, the luminance is controlled, as described later, using the temperature difference estimated value Td representing the temperature difference in the portion most easily damaged, thereby more reliably preventing the PDP 11 form being damaged.

In the present embodiment, the PDP 11 corresponds to a display, the temperature difference estimator 4 corresponds to a temperature estimation circuit and an operation circuit, and the brightness controller 2, the controller 3, the data driver 12, the scan driver 13, and the sustain driver 14 correspond to a control circuit. Further, the periphery adjacent portion separator 41, the integration circuit 42, and the dissipated heat subtraction circuit 43 correspond to a temperature estimation circuit; and the subtracter 44 corresponds to an operation circuit.

Description is now made of a gray scale display method using five types of light emitting formats in which the total number of gray scales is 256, and one field is divided into eight sub-fields to perform displays as an example of a gray scale display method for the display device configured as described above. The gray scale display method to which the present invention is applied is not particularly limited to the following example. Another gray scale display method may be used.

FIG. 6 is a diagram showing sub-fields where sustain discharges should be induced when the display screen is displayed at each gray scale level in a case where the total number of gray scales is 256. In FIG. 6, the sub-fields SF1 to SF8 are successively respectively weighted with brightness values 1, 2, 4, 8, 16, 32, 64, and 128, for example. Each of the weights is a value proportional to the luminance of the display screen, for example, the number of times of light emission in each of the discharge cells.

In FIG. 6, the sub-fields SF1 to SF8 used for causing the discharge cell to emit light at each gray scale level are indicated by ○. In order to cause the discharge cell to emit light at a gray scale level 1, the sub-field SF1 (a weight 1) may be used. In order to cause the discharge cell to emit light at a gray scale level 3, the sub-field SF1 and the sub-field SF2 (a weight 2) may be used, and a corresponding column in each of the sub-fields is assigned ○. If the sub-fields are combined with each other to cause the discharge cell to emit light in a number of times of light emission corresponding to the weight, gray scale display can be performed at each of the gray scale levels 0 to 255. The number of sub-fields obtained by the division, the weights, and so forth are not particularly limited to those in the above-mentioned example, and various modifications are possible.

Description is now made of five types of light emitting formats in which the total number of gray scales is 256 as an example of a light emitting format using the sub-fields SF1 to SF8 which are weighted as described above.

FIG. 7 is a diagram showing the number of light emitting pulses in each of the sub-fields SF1 to SF8 in each of the five types of light emitting formats A to E. Each of the light emitting formats A to E is determined by the controller 2 depending on the temperature estimated value Td, as described later, and is specified by the light emitting pulse control signal EC.

In the light emitting format A, the total number of light emitting pulses is 1275, five light emitting pulses are assigned to the sub-field SF1, 10 light emitting pulses are assigned to the sub-field SF2, and 20, 40, 80, 160, 320, and 640 light emitting pulses are similarly assigned, respectively, to the sub-fields SF3 to SF8.

The total number of light emitting pulses is 1020 in the light emitting format B, the total number of light emitting pulses is 765 in the light emitting format C, the total number of light emitting pulses is 510 in the light emitting format D, and the total number of light emitting pulses in the light emitting format E is 255. The number of light emitting pulses, as shown, is assigned to each of the sub-fields SF1 to SF8.

When the sub-fields SF1 to SF8 are combined to perform display on 256 gray scales, therefore, the light emitting formats A to E differ in the number of light emitting pulses and luminance even at the same gray scale level. That is, when the luminance in the light emitting format E is used as a basis (once), the luminance in the light emitting format D is twice that in the light emitting format E, the luminance in the light emitting format C is three times that in the light emitting format E, the luminance in the light emitting format B is four times that in the light emitting format E, and the luminance in the light emitting format A is five times that in the light emitting format E. Consequently, the light emitting formats are successively switched from A to E, therefore, the luminance of the display screen can be lowered without significantly changing the total number of gray scales.

Figure 8:
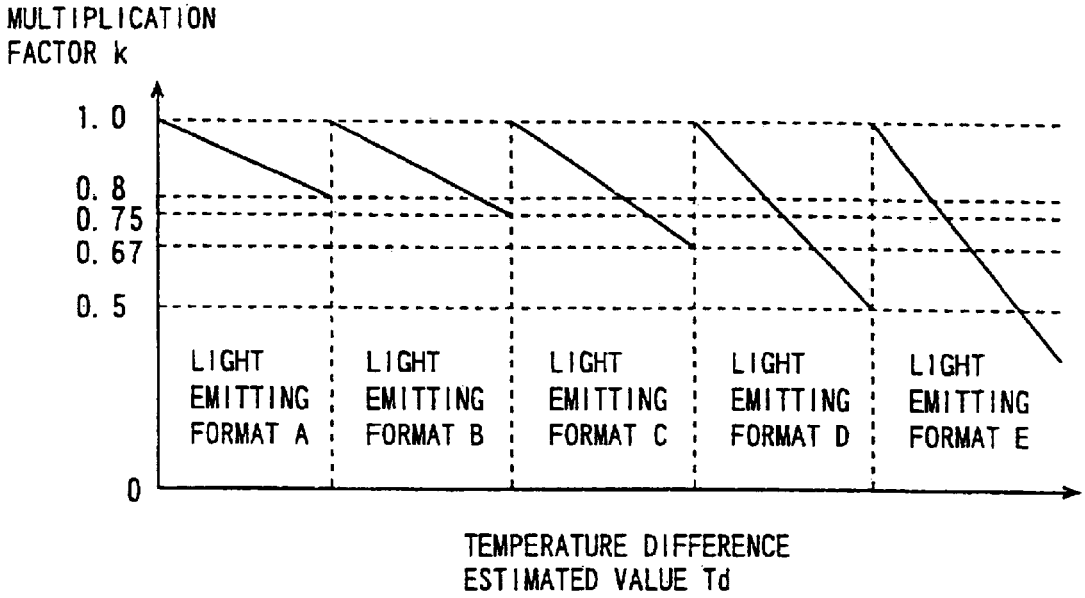
FIG. 8 is a diagram showing the relationship between a temperature difference estimated value and a multiplication factor in a case where light emitting formats A to E shown in FIG. 7 are used.

Description is now made of the relationship between a temperature difference estimated value Td and a multiplication factor k in a case where the light emitting formats A to E are combined with each other to induce sustain discharges. FIG. 8 is a diagram showing the relationship between a temperature difference estimated value Td and a multiplication factor k in a case where the light emitting formats A to E are combined with each other to induce sustain discharges. The relationship between the temperature difference estimated value Td and the multiplication factor k shown in FIG. 8 is previously stored in the controller 3. The light emitting format and the multiplication factor k which correspond to the temperature difference estimated value Td estimated by the temperature difference estimator 4 are specified by the controller 3.

As shown in FIG. 8, in the light emitting format A, as the temperature difference estimated value Td increases, the multiplication factor k linearly decreases from 1.0 to 0.8. Then, in the light emitting format B, as the temperature difference estimated value Td increases, the multiplication factor k decreases from 1.0 to 0.75. Then, in the light emitting format C, as the temperature difference estimated value Td increases, the multiplication factor k decreases from 1.0 to 0.67. Then, in the light emitting format D, as the temperature difference estimated value Td increases, the multiplication factor k decreases from 1.0 to 0.5. Finally, in the light emitting format E, as the temperature difference estimated value Td increases, the multiplication factor k decreases from 1.0.

From the following reason, the multiplication factor is returned to 1.0 when the light emitting format is switched after decreasing from 1.0. That is, the total number of light emitting pulses in the light emitting format A is 1275, and the total number of light emitting pulses in the light emitting format B is 1020. Accordingly, the ratio of the numbers of pulses is 0.8. When the light emitting format is switched from A to B, therefore, the multiplication factor k is switched from 0.8 to 1.0, thereby making it possible to reduce the number of light emitting pulses at a predetermined ratio depending on the temperature difference estimated value Td before and after the switching and to linearly control the luminance of the display screen. The same is true even at the time of later switching the light emitting format.

The multiplication factor k is thus switched depending on the total number of light emitting pulses at the time of switching the light emitting format, thereby making it possible to linearly control the luminance of the display screen depending on the temperature difference estimated value Td even when the image is displayed using the different light emitting format as well as to lower the luminance without extremely reducing the total number of gray scales.

Figure 9:
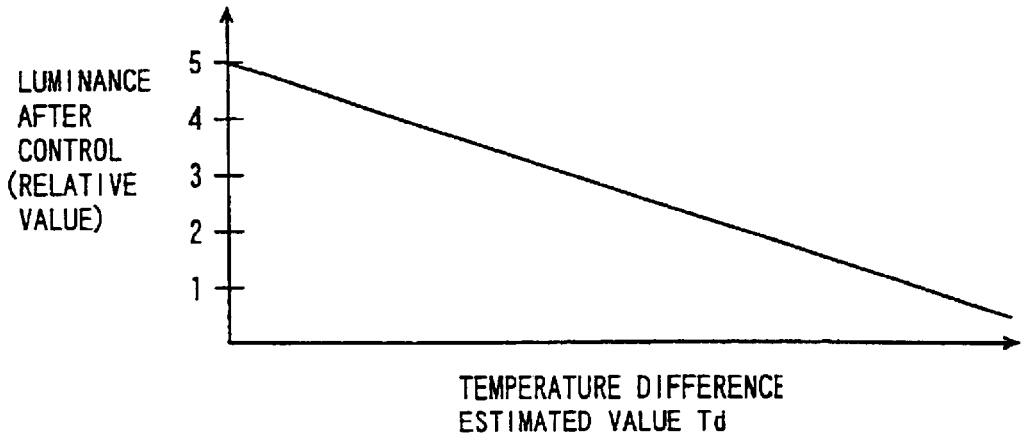
FIG. 9 is a diagram showing the relationship between a temperature difference estimated value and luminance after control in a case where the temperature difference estimated value and the multiplication factor shown in FIG. 8 are used.

When the video signal VS is multiplexed by the multiplication factor k, to display the image using the video signal, the temperature difference estimated value Td increases, and the luminance after the control linearly decreases, as shown in FIG. 9, thereby making it possible to lower the luminance of the display screen depending on the temperature difference estimated value Td. In FIG. 9, the luminance in a case where the luminance is not decreased, that is, the temperature difference estimated value Td is zero is 5 (a relative value).

Figure 10:
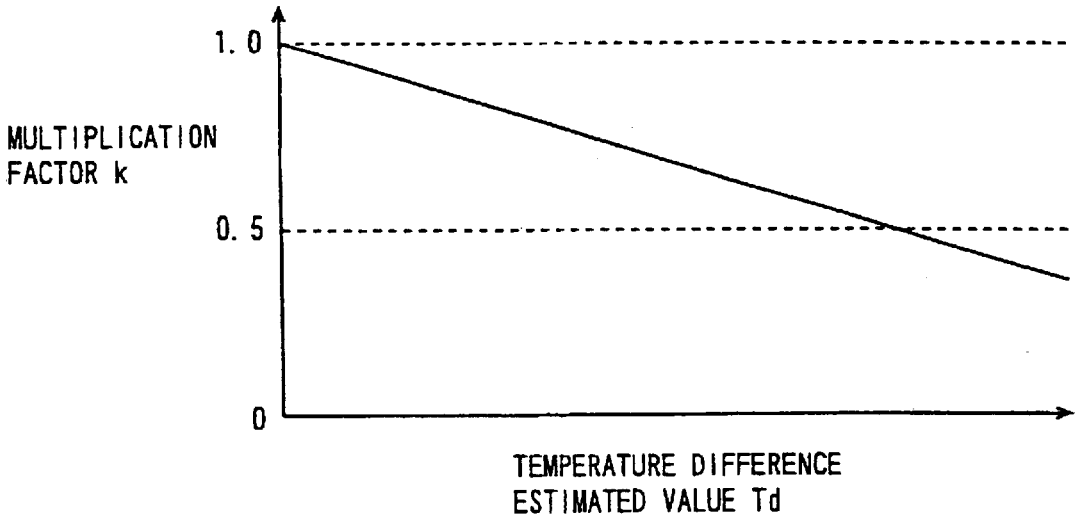
FIG. 10 is a diagram showing the relationship between a temperature difference estimated value and a multiplication factor in a case where a light emitting format A shown in FIG. 7 is used.

The light emitting format is not particularly limited to the above-mentioned example. The sustain discharges may be induced using only the light emitting format A out of the light emitting formats A to E. FIG. 10 is a diagram showing the relationship between the temperature difference estimated value Td and the multiplication factor k in a case where the light emitting format A is used. When the temperature difference estimated value Td is zero, that is, the temperature is not raised, as shown in FIG. 10, the multiplication factor k is outputted as 1.0. As the temperature difference estimated value Td increases, the multiplication factor k linearly decreases. Consequently, the video signal VS is multiplexed by the multiplication factor k by the multiplication circuit 21, thereby making it possible to lower the luminance of the display screen depending on the temperature difference estimated value Td, as in a case shown in FIG. 9.

Description is now made of a first luminance control method for the plasma display device configured as described above.

First in the temperature difference estimator 4, a video signal for the periphery adjacent portion is separated from a video signal VS by the periphery adjacent portion separator 41, a luminance signal in the video signal for the periphery adjacent portion is integrated by the integration circuit 42, and the amount of dissipated heat is subtracted by the dissipated heat subtraction circuit 43, to calculate a temperature estimated value Te for the periphery adjacent portion. A reference value To for the panel outer periphery set by the panel periphery temperature setter 5 is subtracted from the temperature estimated value Te for the periphery adjacent portion by the subtracter 44, so that a temperature difference estimated value Td for the periphery of the display screen is calculated.

As shown in FIG. 8, a light emitting format and a multiplication factor k which correspond to the temperature difference estimated value Td are then determined by the controller 3, so that a light emitting pulse control signal EC corresponding to the determined light emitting format and a brightness control signal LC including the determined multiplication factor k are generated.

Then in the brightness controller 2, the video signal VS is multiplied by the multiplication factor k included in the brightness control signal LC by the multiplication circuit 21, so that a video signal whose luminance has been controlled is generated depending on the multiplication factor k. Image data for each sub-field in the light emitting format corresponding to the light emitting, pulse control signal EC included in the brightness control signal LC is then generated from the video signal corresponding to one field whose luminance has been controlled by the video signal/sub-field corresponder 22, and a data driver driving control signal DS corresponding to the image data is outputted. Further, a scan driver driving control signal CS and a sustain driver driving control signal US which correspond to each sub-field in the light emitting format corresponding to the light emitting pulse control signal EC are generated by the sub-field pulse generator 23.

Finally, in the display 1, address discharges in the corresponding discharge cell are induced in response to the data driver driving control signal DS and the scan driver driving control signal CS by the data driver 12 and the scan driver 13, and sustain discharges are then induced in the discharge cell in which the address discharges have been induced in response to the scan driver driving control signal CS and the sustain driver driving control signal US by the scan driver 13 and the sustain driver 14. Accordingly, an image is displayed on the display screen with the luminance controlled depending on the multiplication factor k. The larger the temperature difference estimated value Td becomes, the lower the luminance of the display screen becomes.

As described in the foregoing, in the luminance control method, the temperature estimated value Te corresponding to the temperature of the periphery adjacent portion of the display screen of the PDP 11 is estimated from the video signal VS, the temperature difference estimated value Td is found using the temperature estimated value Te and the reference value To corresponding to the temperature of the panel outer periphery, the light emitting format and the multiplication factor k which correspond to the temperature difference estimated value Td are determined, and the luminance of the display screen of the PDP 11 is controlled by the light emitting format and the multiplication factor k which have been determined. Consequently, the luminance can be controlled on the basis of the temperature difference between the panel outer periphery which greatly affects the damage to the PDP 11 and the periphery adjacent portion closest to the panel outer periphery, thereby making it possible to more reliably prevent the PDP 11 from being damaged. Further, only the temperature estimated value Td for the periphery adjacent portion is operated, so that the amount of operation is reduced, thereby making it possible to simplify the processing as well as to shorten the processing time.

Description is now made of a second luminance control method for the plasma display device. The second luminance control method is a method of dividing the display screen into a plurality of blocks and controlling the luminance of the peripheral block adjacent to the outer periphery of the display screen out of the blocks obtained by the division. The control method is carried out by the controller 3 outputting a multiplication factor k corresponding to a temperature difference estimated value Td when a video signal VS corresponding to the peripheral block is inputted to the multiplication circuit 21, outputting one as the multiplication factor k when the video signal VS corresponding to the inner block other than the peripheral block is inputted to the multiplication circuit 21, and multiplying the video signal VS by the multiplication factors k by the multiplication circuit 21. In this case, a vertical synchronizing signal and a horizontal synchronizing signal, for example, are inputted to the controller 3 through the temperature difference estimator 4, and the display screen is divided using the horizontal synchronizing signal and the vertical synchronizing signal, for example, to specify the peripheral block.

FIG. 11 is a diagram showing an example of a multiplication factor k for each block in a case where the luminance of the peripheral block is controlled. In the following, description is made of a case where the display screen is divided into a total of 25 blocks, that is, five blocks in the longitudinal direction and five blocks in the transverse direction. However, the number of divisions of the display screen is not particularly limited to that in this example. The number can be suitably determined depending on the number of pixels composing the display screen, and the processing capabilities of the temperature difference estimator 4, the controller 3, and so forth, for example. In FIG. 11, a discharge cell in the outermost periphery is positioned in the outermost periphery of each peripheral block, and an outer frame indicates the outer periphery of the PDP 11.

In the example shown in FIG. 11, the multiplication factor k for the peripheral blocks (blocks indicated by hatching) is set to 0.5, and the multiplication factor k for the other inner blocks is set to one. In this case, the multiplication factor k is decreased only in a portion of the peripheral block most easily damaged, and the luminance of this portion is reduced. Consequently, the PDP 11 can be more reliably prevented from being damaged without lowering the luminance of the inside of the display screen.

Description is now made of a third luminance control method for the plasma display device. The third luminance control method is a method of controlling the luminance of each of blocks such that the luminance of the peripheral block is made lower than that of the inner block. The control method is carried out by the controller 3 outputting a multiplication factor k corresponding to a temperature difference estimated value Td when a video signal VS corresponding to the peripheral block is inputted to the multiplication circuit 21, increasing the multiplication factor k depending on the position of each of the blocks such that the multiplication factor for the block at the center is one when the video signal VS corresponding to the inner block other than the peripheral block is inputted to the multiplication circuit 21, and multiplying the video signal VS by the multiplication factor k by the multiplication circuit 21.

FIG. 12 is a diagram showing an example of the multiplication factor k for each block in a case where the luminance of the blocks is controlled such that the luminance of the peripheral blocks is made lower than that of the inner blocks. In the example shown in FIG. 12, the multiplication factor k for the peripheral blocks is set to 0.5, the multiplication factor k for the inner blocks is set to 0.75, and the multiplication factor k for the block at the center is set to one. In this case, the luminance of a portion of the peripheral block most easily damaged is most greatly reduced, thereby making it possible to more reliably prevent the PDP 11 from being damaged. Since the multiplication factor k is gradually decreased toward the outer periphery of the PDP 11, the change in the luminance by the change in the multiplication factor k is difficult to visually know, thereby making it possible to prevent the image quality from being degraded. The amount of change of the multiplication factor k depending on the position of the block is not particularly limited to that in the above-mentioned example. Various modifications are possible. For example, the amount of change on the side of the outer periphery is made larger.

Description is now made of a plasma display device according to a second embodiment of the present invention.

Figure 13:
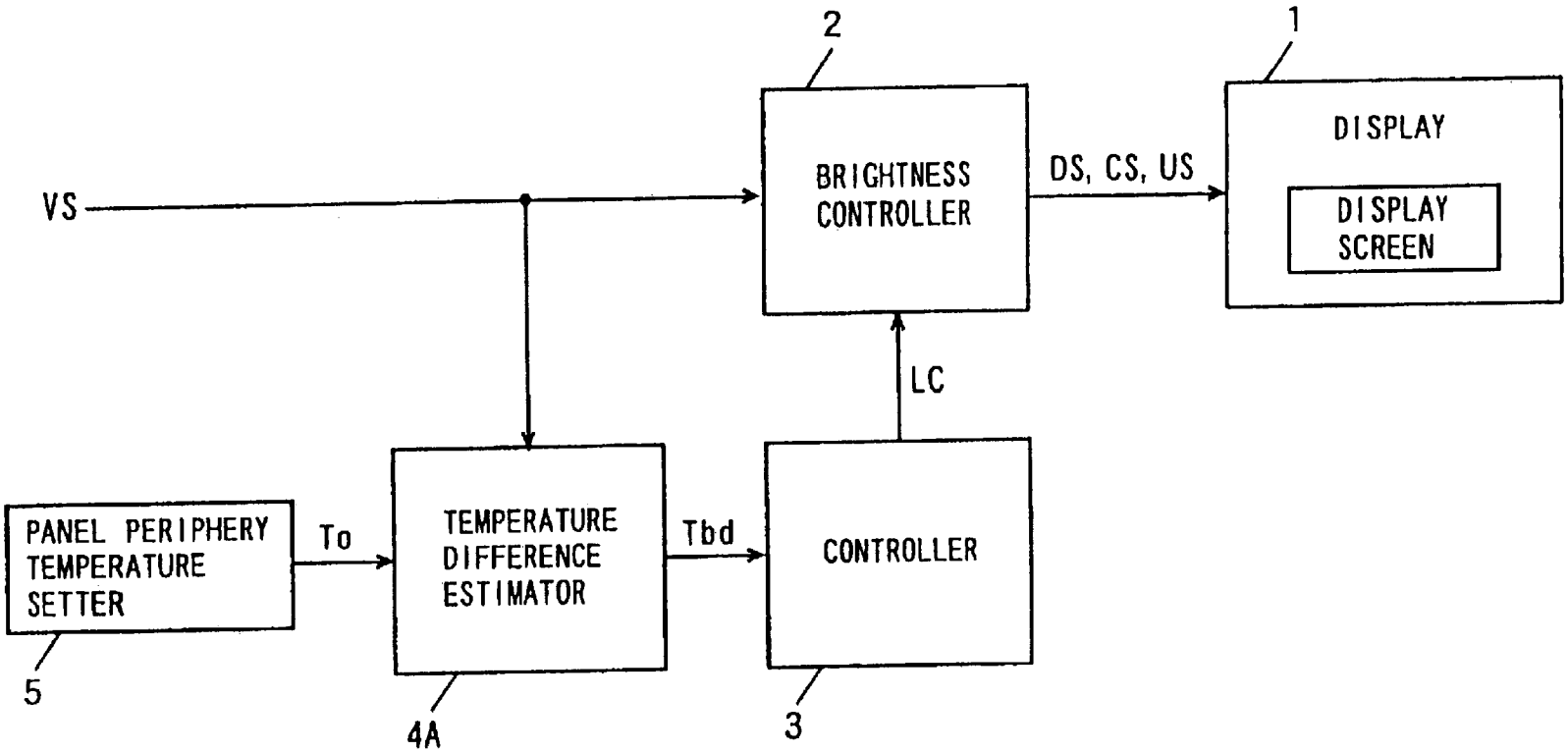
FIG. 13 is a block diagram showing the configuration of a plasma display device according to a second embodiment of the present invention.

FIG. 13 is a block diagram showing the configuration of the plasma display device according to the second embodiment of the present invention.

The plasma display device shown in FIG. 13 divides a display screen of a display 1 into a plurality of blocks, finds a peripheral block temperature difference estimated value Tbd for each peripheral block adjacent to the outer periphery of the display screen out of the blocks obtained by the division, and controls luminance using the peripheral block temperature difference estimated value Tbd. Consequently, the plasma display device shown in FIG. 13 is the same as the plasma display device shown in FIG. 1 except that the temperature difference estimator 4 is changed into a temperature difference estimator 4A for estimating the peripheral block temperature difference estimated value Tbd for each peripheral block. Accordingly, the same portions are assigned the same reference numerals and hence, the description thereof is not repeated. Only the temperature difference estimator 4A obtained by the change will be described in detail.

Figure 14:
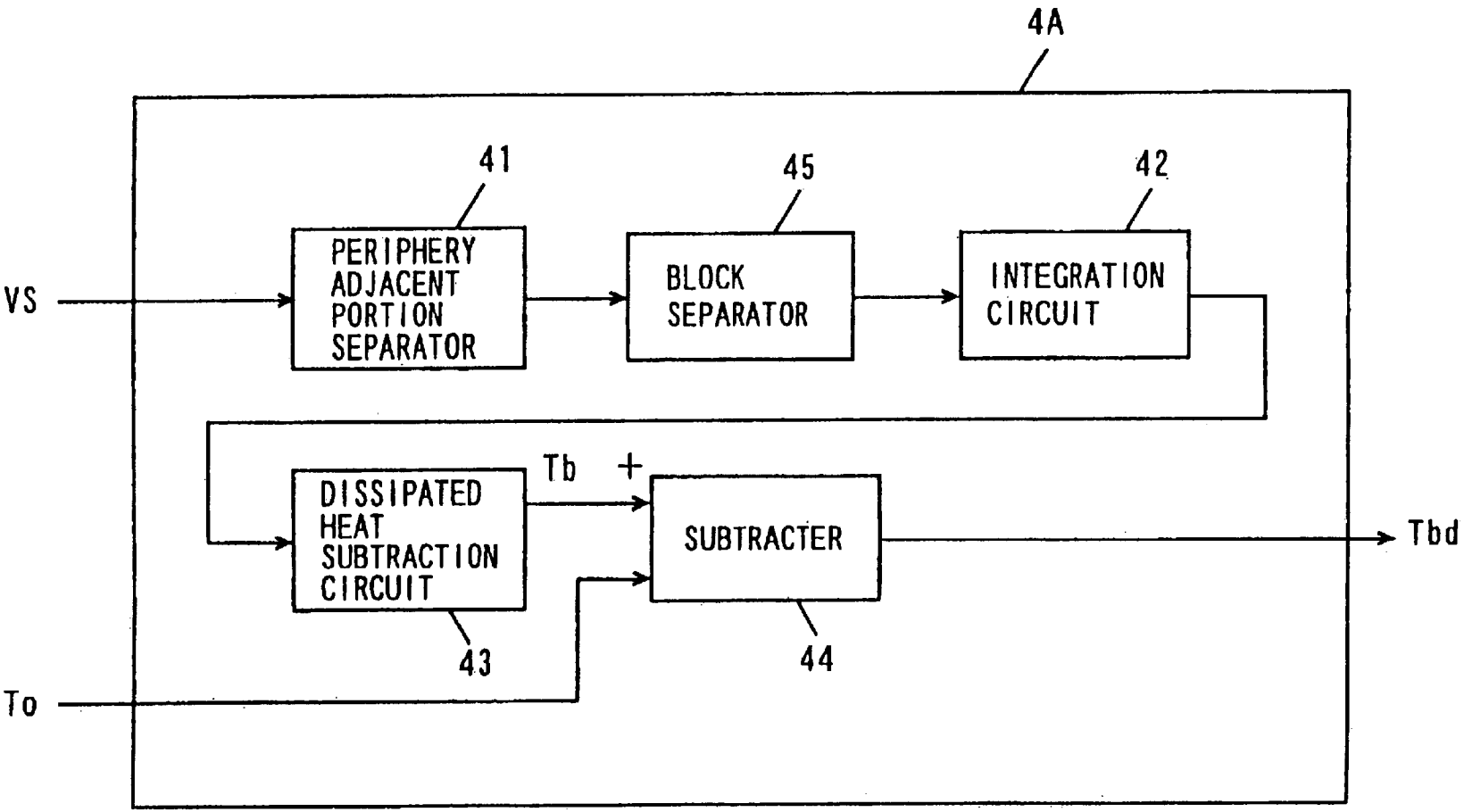
FIG. 14 is a block diagram showing the configuration of a temperature difference estimator shown in FIG. 13.

FIG. 14 is a block diagram showing the configuration of the temperature difference estimator 4A shown in FIG. 13. The temperature difference estimator 4A shown in FIG. 14 is the same as the temperature difference estimator 4 shown in FIG. 2 except that a block separator 45 is added between a periphery adjacent portion separator 41 and an integration circuit 42. Accordingly, the same portions are assigned the same reference numerals and hence, the description thereof is not repeated.

As shown in FIG. 14, the block separator 45 is connected to the periphery adjacent portion separator 41, and receives a video signal for a periphery adjacent portion which is outputted from the periphery adjacent portion separator 41, separates the video signal for each peripheral block adjacent to the outer periphery of the display screen, and outputs the divided video signal to the integration circuit 42. In this case, a vertical synchronizing signal and a horizontal synchronizing signal, for example, included in the video signal VS are inputted to the block separator 45, so that the peripheral block is extracted using the horizontal synchronizing signal and the vertical synchronizing signal, for example. In a stage succeeding the integration circuit 42, each processing is performed, as in the first embodiment, for each peripheral block. Finally, the peripheral block temperature difference estimated value Tbd is outputted for each peripheral block from a subtracter 44.

Figure 15:
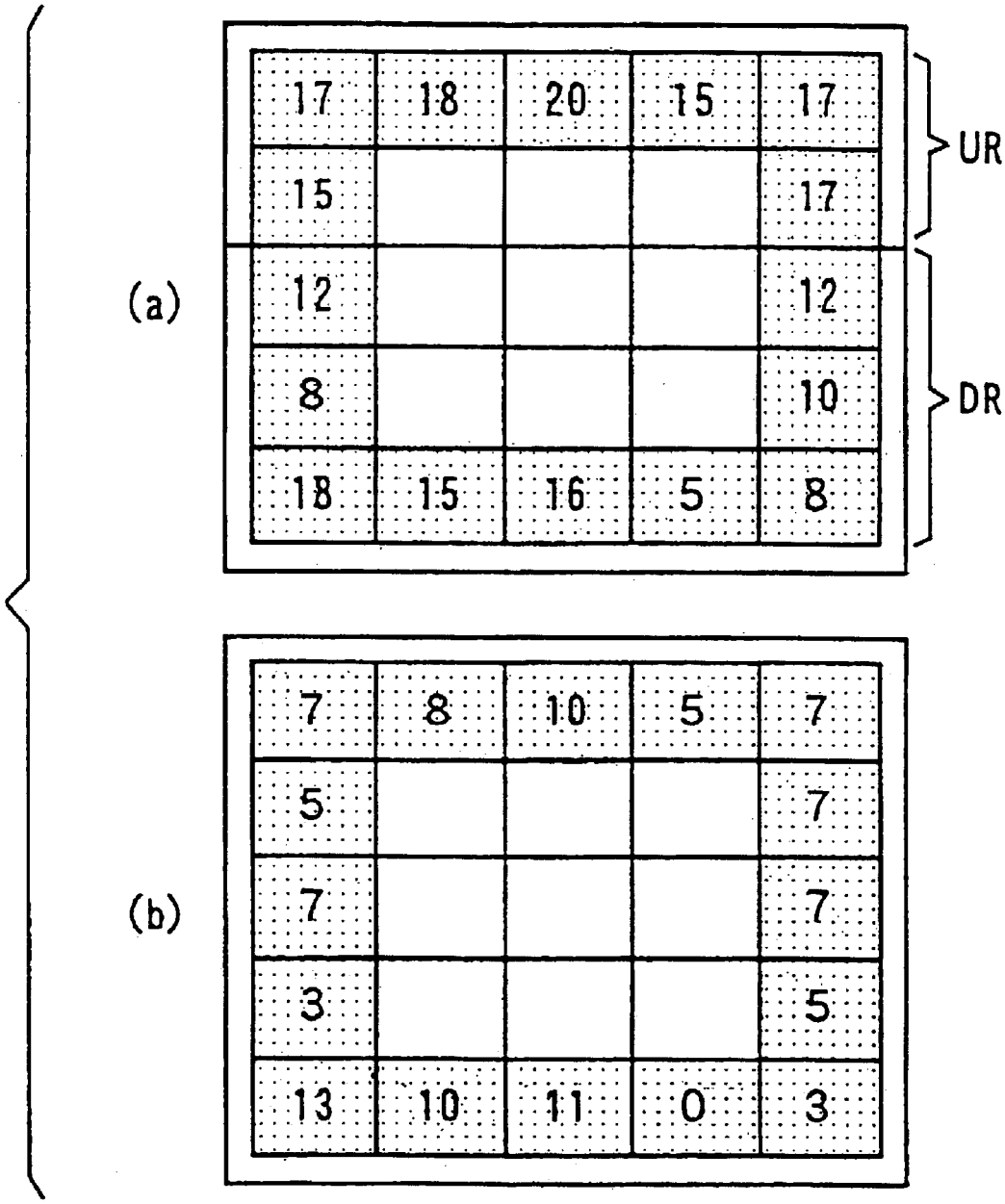
FIG. 15 is a diagram showing an example of a temperature estimated value and a peripheral block temperature difference estimated value which are estimated for each peripheral block.

FIG. 15 is a diagram showing an example of a temperature estimated value Tb and a peripheral block temperature difference estimated value Tbd which are estimated for each peripheral block. Although in the following, description is made of a case where the display screen is divided into five blocks in the longitudinal direction and five blocks in the transverse direction, and the block adjacent to the outer periphery of the display screen out of the blocks obtained by the division is taken as a peripheral block, the number of divisions of the display screen is not particularly limited to that in this example. The number can be suitably determined depending on the number of pixels composing the display screen, and the processing capabilities of the temperature difference estimator 4A, the controller 3, and so forth, for example. In FIG. 15, a discharge cell in the outermost periphery is positioned in the outermost periphery of the peripheral block, and an outer frame indicates the outer periphery of a PDP 11.

As shown in FIG. 15(a), the temperature estimated value Tb is determined for each peripheral block. For example, the temperature estimated value Tb for the peripheral block in the upper left of the display screen is 17, the temperature estimated value Tb for the peripheral block adjacent thereto on the right side is 18, and the temperature estimated value Tb for the peripheral block adjacent thereto on the right side is 20. The temperature estimated value Tb is thus estimated for each peripheral block.

A reference value To is subtracted from each of the temperature estimated values Tb shown in FIG. 15(a). In this example, the reference value To for the peripheral blocks included in two rows in an upper part UR is set to 10, and the reference value To for the peripheral blocks included in three rows in a lower part DR is set to five. Consequently, the peripheral block temperature difference estimated value Tbd for each of the peripheral blocks from which each of the reference values has been subtracted is a value shown in FIG. 15(b). A multiplication factor k is determined, as in FIG. 8, for each of the peripheral blocks using the value, and the luminance of the peripheral block is controlled depending on the multiplication factor k.

Generally in the PDP 11, an address electrode AD is wired to its upper part, as shown in FIG. 5. Accordingly, a vent for cooling, for example, is provided in its lower part. The temperature of the upper part tends to be raised more easily, as compared with the temperature of the lower part. Consequently, a high reference value is set with respect to the upper part UR in the PDP 11, and a lower reference value is set in the lower part DR, as compared with that in the upper part UR, thereby making it possible to calculate a temperature difference estimated value closer to thermal stress actually created in the panel outer periphery of the PDP 11. As a result, the PDP 11 can be more reliably prevented from being damaged, and the luminance is not lowered any more than necessary. A method of controlling luminance using a plurality of reference values which differ depending on the position of the panel outer periphery of the PDP 11, as described above, is also applicable to other embodiments.

The controller 3 uses the peripheral block temperature difference estimated value Tbd for each peripheral block found in the above-mentioned manner, to output a brightness control signal LC to a brightness controller 2 such that luminance is controlled for each peripheral block. The brightness controller 2 outputs to the display 1 an address driver driving control signal AD, a scan driver driving control signal CS, and a sustain driver driving control signal US for controlling the luminance for each peripheral block in response to a brightness control signal LC. In the display 1, the luminance is controlled for each peripheral block in response to each of the inputted driving control signals by each luminance control method described below.

The present embodiment is the same as the first embodiment except that the temperature difference estimator 4A corresponds to a temperature estimation circuit and an operation circuit, and the block separator 45 corresponds to a block extraction circuit.

A first luminance control method for the plasma display device configured as described above will be described. The first luminance control method is a method of estimating a temperature estimated value Tb for each peripheral block, subtracting a reference value To from the temperature estimated value Tb for the peripheral block to find a peripheral block temperature difference estimated value Tbd, and controlling luminance depending on the peripheral block temperature difference estimated value Tbd for the peripheral block. Also in the control method, a multiplication factor k corresponding to the peripheral block temperature difference estimated value Tbd for the peripheral block is outputted when a video signal VS corresponding to the peripheral block separated by the block separator 45 is inputted to a multiplication circuit 21, one is outputted as the multiplication factor k when the video signal VS corresponding to the inner block other than the peripheral block is inputted to the multiplication circuit 21, and the video signal VS is multiplied by the multiplication factors k by the multiplication circuit 21.

FIG. 16 is a diagram showing an example of a peripheral block temperature difference estimated value Tbd and a multiplication factor for each peripheral block in a case where luminance is controlled for the peripheral block by the first luminance control method.

First, as shown in FIG. 16(a), it is assumed that a peripheral block temperature difference estimated value Tbd is estimated for each peripheral block. That is, it is assumed that the peripheral block temperature difference estimated value Tbd for the peripheral blocks positioned at the respective centers of the upper side, the lower side, the left side, and the right side of the display screen is 20, and the peripheral block temperature difference estimated value Tbd for the other peripheral blocks is zero. In this case, a multiplication factor k for the peripheral block is as shown in FIG. 16(b). That is, the multiplication factor k for the peripheral blocks at the respective centers of the upper side, the lower side, the left side, and the right side is 0.5, and the multiplication factor k for the other peripheral blocks is one. The luminance of each of the peripheral blocks is controlled depending on the multiplication factor k.

In this case, the multiplication factor k is decreased only in the peripheral block where the peripheral block temperature difference estimated value Tbd is large, and only the luminance of this portion is reduced. Consequently, only the luminance of the peripheral block most easily damaged is lowered without lowering the luminance of the other block, thereby making it possible to more reliably prevent the PDP 11 from being damaged.

A second luminance control method for the plasma display device will be described. The second luminance control method is for controlling luminance for each peripheral block on the basis of a peripheral block temperature difference estimated value Tbd' obtained by subjecting a peripheral block temperature difference value Tbd between adjacent peripheral blocks to filtering processing such that the amount of controlled luminance between the adjacent peripheral blocks is smoothly changed. In the control method, the peripheral block temperature difference estimated value Tbd is subjected to filtering processing such as integration or interpolation between the adjacent peripheral blocks by the controller 3, a multiplication factor k corresponding to the peripheral block temperature difference estimated value Tbd after the filtering processing is outputted, and a video signal VS corresponding to the peripheral block is multiplied by the multiplication factor k in the multiplication circuit 21.

FIG. 17 is a diagram showing an example of a peripheral block temperature difference estimated value Tbd for each peripheral block, a peripheral block temperature difference estimated value Tbd' after filtering processing, and a multiplication factor k in a case where luminance is controlled for each peripheral block such that the amount of controlled luminance is smoothly changed by the second luminance control method.

First, as shown in FIG. 17(a), it is assumed that a peripheral block temperature difference estimated value Tbd is estimated for each peripheral block, as in FIG. 16(a). The peripheral block temperature difference estimated value Tbd is then filtered by interpolation between the adjacent peripheral blocks. The peripheral block temperature difference estimated value Tbd' after the filtering processing is as shown in FIG. 17(b). A peripheral block temperature difference estimated value Tbd for the peripheral block between the peripheral block having a peripheral block temperature difference estimated value Tbd of 20 and the peripheral block having a peripheral block temperature difference estimated value Tbd of 0 is interpolated from zero to 10. In this case, a multiplication factor k for each of the peripheral blocks is as shown in FIG. 17(c). That is, the multiplication factor k for the peripheral blocks at the respective centers of the upper side, the lower side, the left side and the right side is 0.5, the multiplication factor k for the peripheral block positioned at each vertex of the display screen is one, and the multiplication factor k for the intermediate peripheral block is 0.75. The multiplication factor k is smoothly changed. The luminance of each of the peripheral blocks is controlled depending on the multiplication factor k.

In this case, the luminance of a portion of the peripheral block most easily damaged is most greatly reduced; and thermal stress in the peripheral block is smoothly changed, thereby making it possible to more reliably prevent the PDP 11 from being damaged. Further, the multiplication factor k is gradually smoothly changed. Accordingly, the change in the luminance by the change in the multiplication factor k is difficult to visually know, thereby making it possible to prevent the image quality from being degraded. The change in the multiplication factor k by the filtering processing is not particularly limited. Various modifications are possible. For example, the multiplication factor k is exponentially changed.

Figure 18:
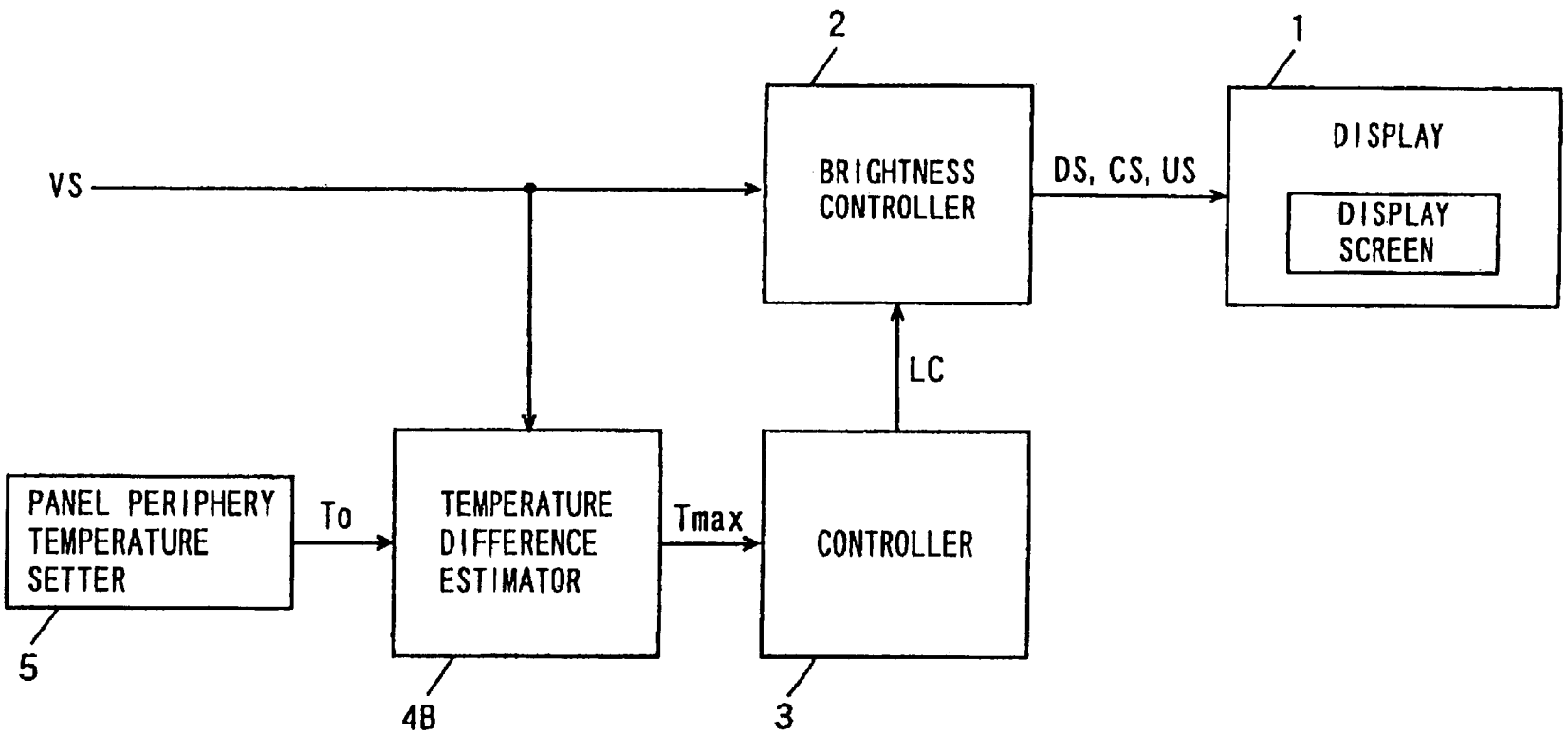
FIG. 18 is a block diagram showing the configuration of a plasma display device according to a third embodiment of the present invention.

Description is now made of a plasma display device according to a third embodiment of the present invention. FIG. 18 is a block diagram showing the configuration of the plasma display device according to the third embodiment of the present invention.

The plasma display device shown in FIG. 18 divides a display screen of a display 1 into a plurality of blocks, finds a peripheral block temperature difference estimated value Tbd for each peripheral block adjacent to the outer periphery of the display screen out of the blocks obtained by the division, extracts the maximum peripheral block temperature difference estimated value Tmax out of the peripheral block temperature difference estimated values Tbd, and controls luminance using the maximum peripheral block temperature difference estimated value Tmax. Consequently, the plasma display device shown in FIG. 18 is the same as the plasma display device shown in FIG. 13 except that the temperature difference estimator 4A is changed into a temperature difference estimator 4B for estimating the peripheral block temperature difference estimated value Tbd for each peripheral block and extracting the maximum peripheral block temperature difference estimated value Tmax. Accordingly, the same portions are assigned the same reference numerals and hence, the description thereof is not repeated. Only the temperature difference estimator 4B obtained by the change will be described in detail.

Figure 19:
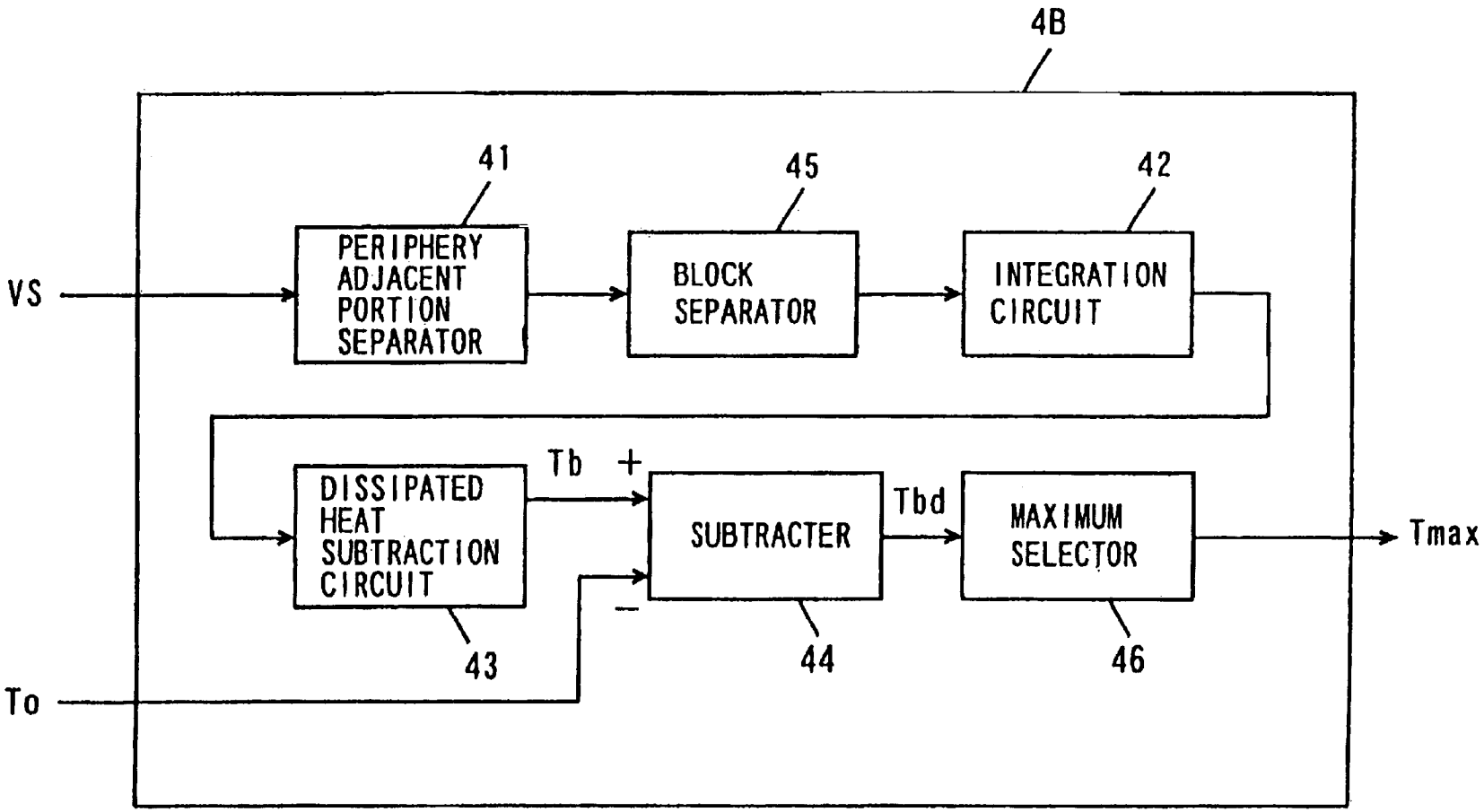
FIG. 19 is a block diagram showing the configuration of a temperature difference estimator shown in FIG. 18.

FIG. 19 is a block diagram showing the configuration of the temperature difference estimator 4B shown in FIG. 18. The temperature difference estimator 4B shown in FIG. 18 is the same as the temperature difference estimator 4A shown in FIG. 14 except that a maximum selector 46 is added in a stage succeeding a subtracter 44. Accordingly, the same portions are assigned the same reference numerals and hence, the description thereof is not repeated.

As shown in FIG. 19, the maximum selector 46 is connected to the subtracter 44, and selects a maximum peripheral block temperature difference estimated value Tb out of the peripheral block temperature difference estimated values Tbd for the peripheral blocks in one field, that is, one display screen which are outputted from the subtracter 44 and extracts the maximum peripheral block temperature difference estimated value Tbd as a maximum peripheral block temperature difference estimated value Tmax.

FIG. 20 is a diagram showing an example of a temperature estimated value Tb, a peripheral block temperature difference estimated value Tbd, and a maximum peripheral block temperature difference estimated value Tmax which are estimated for each peripheral block.

As shown in FIG. 20(a), it is assumed that a temperature estimated value Tb is estimated for each peripheral block, as in FIG. 15(a). As shown in FIG. 20(b), a peripheral block temperature difference estimated value Tbd for each peripheral block is then found, as in FIG. 15(b). Finally, a peripheral block at the lower left corner having a maximum peripheral block temperature difference estimated value Tbd (13 in the example shown in FIG. 20) out of peripheral block temperature difference estimated values Tbd shown in FIG. 20(b) is selected, and 13 which is the peripheral block temperature difference estimated value Tbd for the peripheral block is taken as the maximum peripheral block temperature difference estimated value Tmax.

As a result, as shown in FIG. 20(C), the peripheral block temperature difference estimated values Tbd for all the peripheral blocks are replaced with the maximum peripheral block temperature difference estimated value Tmax. A multiplication factor k is determined, as in FIG. 8, for each peripheral block using the maximum peripheral block temperature difference estimated value Tmax, and the luminance of each of the peripheral blocks is controlled depending on the multiplication factor k.

A controller 3 uses the maximum peripheral block temperature difference estimated value Tmax found in the above-mentioned manner, to output a brightness control signal LC to a brightness controller 2 such that the luminance is controlled for each peripheral block. The brightness controller 2 outputs to a display 1 an address driver driving control signal AD, a scan driver driving control signal CS, and a sustain driver driving control signal US for controlling luminance for each peripheral block depending on the brightness control signal LC. In the display 1, the luminance is controlled in response to each of the inputted driving control signals.

The present embodiment is the same as the second embodiment except that a temperature difference estimator 4B corresponds to a temperature estimation circuit and an operation circuit.

In the plasma display device configured as described above, the luminance control method for each of the above-mentioned embodiments can be used, thereby making it possible to obtain the same effect.

In the present embodiment, the luminance is controlled using the maximum peripheral block temperature difference estimated value Tmax representing the largest temperature difference in the peripheral blocks, thereby making it possible to more reliably prevent the PDP 11 from being damaged. Further, the luminance is controlled by one maximum peripheral block temperature difference estimated value, so that processing for controlling the luminance is simplified.

Figure 21:
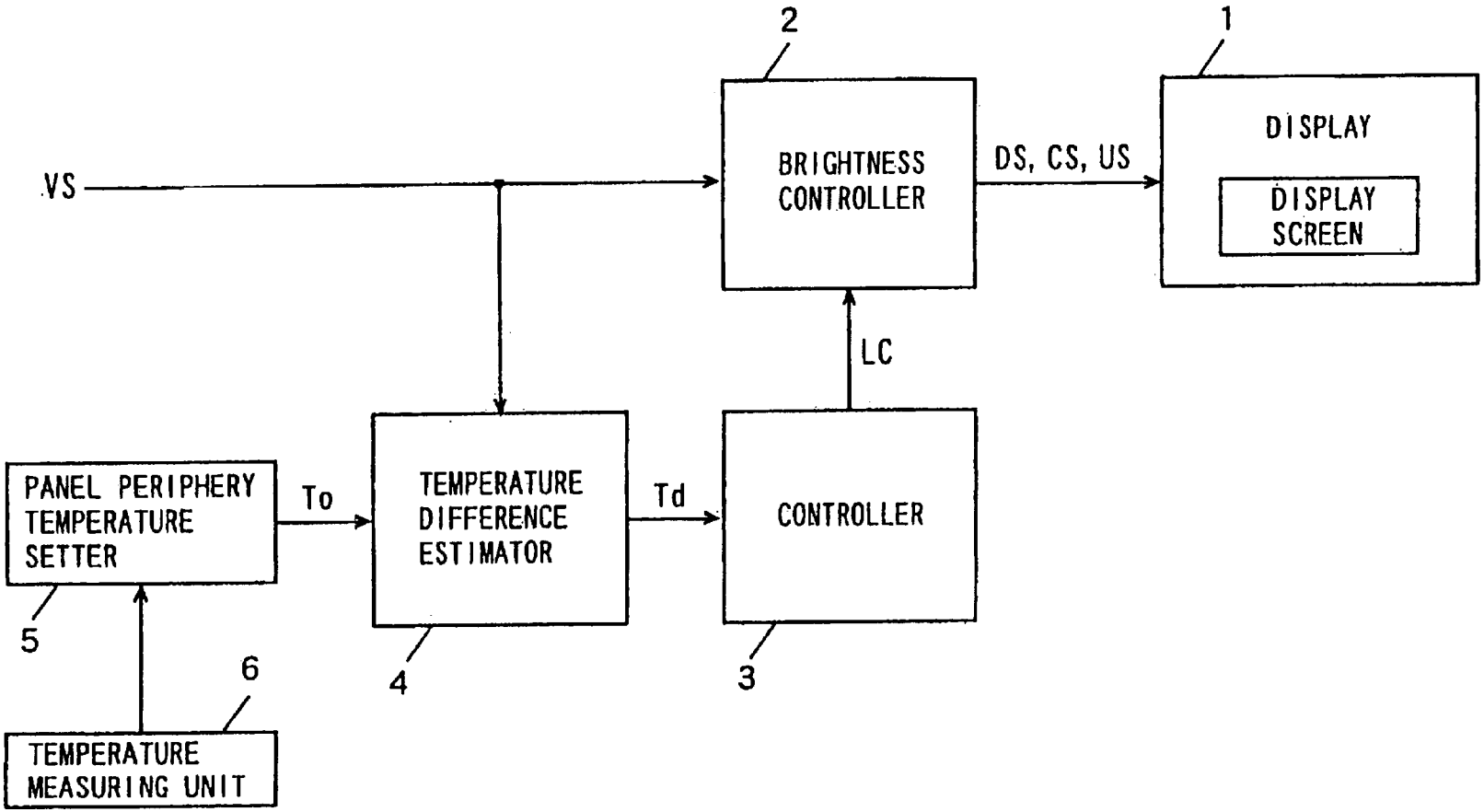
FIG. 21 is a block diagram showing the configuration of a plasma display device according to a fourth embodiment of the present invention.

Description is now made of a plasma display device according to a fourth embodiment of the present invention. FIG. 21 is a block diagram showing the configuration of the plasma display device according to the fourth embodiment of the present invention.

The plasma display device shown in FIG. 21 is the same as the plasma display device shown in FIG. 1 except that a temperature measuring unit 6 is added. Accordingly, the same portions are assigned the same reference numerals and hence, the description thereof is not repeated.

As shown in FIG. 21, the temperature measuring unit 6 is connected to a panel periphery temperature setter 5, and directly measures the temperature of the panel outer periphery of a PDP 11 and outputs the measured temperature to the panel periphery temperature setter 5. The panel periphery temperature setter 5 sets a reference value To corresponding to the measured temperature and outputs the set reference value To to a temperature difference estimator 4. After that, the subsequent processing is performed, as in the first embodiment, so that luminance is controlled.

The present embodiment is the same as the first embodiment except that the panel periphery temperature setter 5 and the temperature measuring unit 6 correspond to a measurement circuit.

In the plasma display device configured as described above, the luminance control method in the first embodiment can be similarly used, thereby making it possible to obtain the same effect. When the temperature measuring unit 6 in the present embodiment is used for another embodiment, a luminance control method in another embodiment can be also similarly used, thereby making it possible to obtain the same effect.

In the present embodiment, the temperature of the panel outer periphery is directly measured, and the luminance can be controlled on the basis of the reference value To corresponding to the temperature. Even when the reference value To is changed due to the variation in outer air temperature, for example, therefore, the PDP 11 can be more reliably prevented from being damaged. The number of measuring points in the temperature measuring unit 6 may be one or plural in the panel outer periphery. When a plurality of points are measured, a reference value may be set for each of the measuring points, or a reference value may be set, for example, with respect to the average of the results of the measurement of the plurality of points.

Although in each of the above-mentioned embodiments, the video signal VS is multiplexed by the multiplication factor k included in the brightness control signal LC outputted from the controller 3 in the multiplication circuit 21 to control the luminance, the maximum luminance of an image displayed on the pdp 11 may be lowered by changing the multiplication circuit 21 into a limiting circuit for limiting the maximum luminance of the video signal, outputting an upper-limit value of the maximum luminance corresponding to the temperature difference estimated value from the controller 3, and limiting only luminance exceeding the upper-limit value of the maximum luminance by the limiting circuit.

What is claimed is:

1. A display device, comprising:

a display having a display screen, that displays an image with a gray scale corresponding to a video signal using a plurality of light emitting formats which are equal in a total number of gray scales but which differ in the number of light emitting pulses on each of the gray scales, and an outer peripheral portion adjacent to said display screen;

a temperature estimation device that provides a temperature estimation value, that corresponds to a temperature of said display screen, from said video signal;

an operation device that obtains a temperature difference estimation value based upon a reference value, that corresponds to a temperature of said outer peripheral portion, and said temperature estimation value; and a control device that selects a light emitting format, from said plurality of light emitting formats, based upon said temperature difference estimation value, to lower a luminance of said image as said temperature difference estimation value increases.

2. The display device of claim 1, wherein said temperature estimation device estimates said temperature estimation value based upon a temperature of an outer periphery adjacent portion in said display screen adjacent to said outer peripheral portion.

3. The display device of claim 1, wherein said display comprises:

a first board;

a second board; and a plurality of light emitting elements interposed between said first board and said second board to form said display screen, an outer periphery of said first board being fixed to an outer periphery of said second board.

4. The display device of claim 3, wherein said outer periphery of said first board and said outer periphery of said second board includes a portion between said light emitting elements positioned in an outermost periphery of said plurality of light emitting elements and a fixed portion of said first board and said second board.

5. The display device of claim 1, wherein said temperature estimation device estimates said temperature estimation value by integrating data related to said luminance from said video signal, and subtracting data corresponding to an amount of dissipated heat from said integrated data, said operation device obtaining said temperature difference estimation value by subtracting said reference value from said temperature estimation value.

6. The display device of claim 1, wherein said gray scale of said displayed image is selected from among a plurality of gray scales, said control device lowering said luminance of said image at a same ratio for each of said plurality of gray scales.

7. The display device of claim 6, wherein said reference value is selected from a plurality of reference values that differ depending on a position of said outer peripheral portion of said display.

8. The display device of claim 1, further comprising:

a measurement device that measures said temperature of said outer peripheral portion of said display, said measurement device outputting said reference value, corresponding to said measured temperature, to said operation device.

9. A method for controlling a luminance of a display having a display screen, that displays an image with a luminance corresponding to a video signal, and an outer peripheral portion adjacent to said display screen, comprising:

estimating a temperature estimation value, corresponding to a temperature of the display screen, from the video signal;

determining a temperature difference estimation value using a reference value corresponding to the temperature of the outer peripheral portion and the temperature estimation value;

selecting a light emitting format, from among a plurality of light emitting formats, based upon the temperature difference estimation value; and lowering the luminance of the image as the temperature difference estimation value increases.

*10. A display device, comprising:*

*a display having a display screen, that displays an image with a gray scale corresponding to a video signal using a plurality of light emitting formats which are equal in a total number of gray scales but which differ in the number of light emitting pulses on each of the gray scales, and an outer peripheral portion adjacent to said display screen;*

*a temperature estimation device that provides a temperature estimation value, that corresponds to a temperature of said display screen, from said video signal;*

*an operation device that obtains a temperature difference estimation value based upon a reference value, that corresponds to a temperature of said outer peripheral portion, and said temperature estimation value; and*

*a control device that controls that luminance of the image based on the temperature difference estimation value.*

* * * * *